US012780570B2

(12) United States Patent
Wu et al.

(10) Patent No.: US 12,780,570 B2
(45) Date of Patent: Nov. 3, 2026

(54) STACKING APPARATUS, BATTERY PRODUCTION LINE, AND STACKING METHOD

(71) Applicant: CONTEMPORARY AMPEREX TECHNOLOGY (HONG KONG) LIMITED, Hong Kong (CN)

(72) Inventors: Kai Wu, Ningde (CN); Xin Cao, Ningde (CN); Jun Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/212,088

(22) Filed: May 19, 2025

(65) Prior Publication Data

US 2025/0276860 A1 Sep. 4, 2025

Related U.S. Application Data

(63) Continuation of application No. PCT/CN2023/135048, filed on Nov. 29, 2023.

(30) Foreign Application Priority Data

Oct. 13, 2023 (CN) ......................... 202311322523.3

(51) Int. Cl.
*B65G 61/00* (2006.01)
*B65G 57/02* (2006.01)
(Continued)

(52) U.S. Cl.
CPC ............. *B65G 57/02* (2013.01); *B65G 57/20* (2013.01); *B65G 61/00* (2013.01); *H01M 10/0404* (2013.01); *B65G 2203/0241* (2013.01)

(58) Field of Classification Search
CPC ........ B65G 57/02; B65G 57/20; B65G 61/00; B65G 2203/0241; H01M 10/0404; Y02P 70/50
See application file for complete search history.

(56) References Cited

U.S. PATENT DOCUMENTS

| | | | |
|---|---|---|---|
| 5,623,808 | A | 4/1997 | Franklin |
| 2022/0055844 | A1 | 2/2022 | Li et al. |

FOREIGN PATENT DOCUMENTS

| | | | |
|---|---|---|---|
| CN | 111483820 | A | 8/2020 |
| CN | 111942841 | A | 11/2020 |

(Continued)

OTHER PUBLICATIONS

International Search Report in the international application No. PCT/CN2023/135048, mailed on Jun. 17, 2024, 6 pages with English translation.

(Continued)

*Primary Examiner* — Lynn E Schwenning
(74) *Attorney, Agent, or Firm* — ANOVA LAW GROUP, PLLC

(57) ABSTRACT

A stacking apparatus configured to stack workpieces into a neat workpiece queue, where the workpiece queue includes a plurality of workpieces. The stacking apparatus includes: a base bracket; a stacking table for carrying at least one workpiece, where the stacking table is arranged on the base bracket; and at least two shapers, where the shapers act in pairs to perform an alignment operation for aligning the workpieces on the stacking table, paired shapers are configured in such a way that at least one of the actions enables the paired shapers to approach or move away from each other along a first direction above the stacking table, and the
(Continued)

alignment operation is performed through the approaching action of the shapers, to obtain the neat workpiece queue through stacking.

18 Claims, 17 Drawing Sheets

(51) Int. Cl.
*B65G 57/20* (2006.01)
*H01M 10/04* (2006.01)

(56) References Cited

FOREIGN PATENT DOCUMENTS

| | | | | | |
|---|---|---|---|---|---|
| CN | 213230606 | U | | 5/2021 | |
| CN | 213976094 | U | | 8/2021 | |
| CN | 114506650 | A | | 5/2022 | |
| CN | 216698464 | U | | 6/2022 | |
| CN | 217822913 | U | | 11/2022 | |
| CN | 218160503 | U | | 12/2022 | |
| CN | 115602905 | B | | 3/2023 | |
| CN | 115842151 | A | | 3/2023 | |
| CN | 218664300 | | * | 3/2023 | B61G 61/00 |
| CN | 218664300 | U | | 3/2023 | |
| CN | 116544484 | | * | 8/2023 | H01M 10/04 |
| CN | 116544484 | A | | 8/2023 | |
| CN | 117059872 | A | | 11/2023 | |
| DE | 10356563 | A1 | | 6/2005 | |
| ES | 292703 | A1 | | 12/1963 | |
| JP | 2021031287 | A | | 3/2021 | |
| WO | WO 2019/002457 | | * | 1/2019 | B29C 65/00 |

OTHER PUBLICATIONS

Written Opinion of the International Search Authority in the international application No. PCT/CN2023/135048, mailed on Jun. 17, 2024, 8 pages with English translation.

Notification of Examination Opinion on Request for Expedited Pre-Examination regarding Chinese Application No. 202311322523.3, issued on Sep. 27, 2023, 6 pages with English translation.

First Office Action of the Chinese application No. 202311322523.3, issued on Nov. 21, 2023, 20 pages with English translation.

Notice of Allowance of the Chinese application No. 202311322523.3, issued on Jan. 9, 2024, 7 pages with English translation.

The Extended European Search Report in the European application No. 23954959.5, mailed on Jan. 22, 2026.

* cited by examiner

STACKING APPARATUS, BATTERY PRODUCTION LINE, AND STACKING METHOD

CROSS-REFERENCE TO RELATED APPLICATIONS

This application is a continuation of International Application No. PCT/CN2023/135048, filed on Nov. 29, 2023, which claims priority to Chinese Patent Application No. 202311322523.3, filed on Oct. 13, 2023 and entitled "STACKING APPARATUS, BATTERY PRODUCTION LINE, AND STACKING METHOD", which are incorporated herein by reference in their entirety.

TECHNICAL FIELD

This disclosure relates to the field of battery production technologies, and in particular, to a stacking apparatus, a battery production line, and a stacking method.

BACKGROUND

New energy batteries are increasingly widely used in life and industry. For example, new energy vehicles equipped with batteries have been widely used. In addition, batteries are further increasingly used in the field of energy storage and the like.

During battery manufacturing, especially during battery assembly, a plurality of batteries usually need to be stacked. During stacking, a plurality of batteries placed by a manipulator need to be aligned with each other. To manufacture battery modules with different specifications, different stacking schemes are sometimes used during stacking. In addition, in the industry, an increasingly high requirement is imposed on flexibility of a battery production line. Therefore, how to quickly and neatly stack batteries or stack battery units for battery assembly according to production requirements of different battery modules in a battery production line is one of research topics in the industry.

SUMMARY

To resolve the foregoing technical problems, this disclosure is intended to provide a stacking apparatus, a battery production line, and a stacking method with high compatibility, to quickly and neatly stack batteries or stack battery units for battery assembly in an automated manner.

This disclosure is implemented by using the following technical solutions.

A first aspect of this disclosure provides a stacking apparatus. The stacking apparatus is configured to stack workpieces into a neat workpiece queue, where the workpiece queue includes a plurality of workpieces. The stacking apparatus includes: a base bracket; a stacking table for carrying at least one workpiece, where the stacking table is arranged on the base bracket; and at least two shapers, where the shapers act in pairs to perform an alignment operation for aligning the workpieces on the stacking table, paired shapers are configured in such a way that at least one of the actions enables the paired shapers to approach or move away from each other along a first direction above the stacking table, and the alignment operation is performed through the approaching action of the shapers, to obtain the neat workpiece queue through stacking.

The stacking apparatus is provided with shapers that act in pairs, and these shapers perform an alignment operation through an action of approaching each other along the first direction above the stacking table. Therefore, workpieces on the stacking table can be aligned by using a simple structure and a simple action to form a neat workpiece queue. In this way, a plurality of workpieces can be quickly aligned in a simple and automated manner, so that labor costs are reduced, and stacking efficiency is improved.

In addition, because alignment and stacking are implemented through approaching between paired shapers, a distance (or a range of an action) between two shapers approaching each other can be adjusted to adapt to workpieces with different sizes and specifications, for example, to be compatible with stacking of a single row of workpieces and stacking of double rows of workpieces. This achieves good compatibility and facilitates flexible production. Moreover, because shapers act in pairs, a throughput of the stacking apparatus can be increased by arranging more than one pair of shapers (for example, two pairs of shapers), to improve production efficiency at the work station.

In some embodiments, the stacking apparatus further includes: a push plate for performing a pushing operation on the workpiece, where the push plate is arranged on the base bracket and is configured to be able to move forward or backward along a second direction that intersects with the first direction, and the pushing operation is performed through the forward movement action of the push plate; and a reference plate, arranged on the base bracket and arranged on an opposite side of the push plate along the second direction, and configured to block the workpiece.

In this way, workpieces can be aligned along the first direction, and the workpieces properly aligned along the first direction can also be aligned along the second direction, so that the workpieces are stacked into a neat and compact workpiece queue along both the first direction and the second direction. Because adjacent workpieces in the workpiece queue along the second direction can abut against each other as close as possible, a length of the workpiece queue can be reduced, and a risk that the workpiece queue is scattered again in a subsequent processing procedure can be reduced. This also facilitates miniaturization and integration of a final product. Moreover, because the pushing operation is performed through the forward movement action of the push plate, the push plate can easily implement the pushing operation even for workpieces with different sizes and specifications. In addition, because the reference plate is further arranged, a starting position of the workpiece queue can be limited, to prevent the workpieces from being excessively pushed. Moreover, the workpieces can be aligned from both sides along the second direction through cooperation between the reference plate and the push plate.

In some embodiments, the push plate is configured to be able to ascend and descend between a first position and a second position at which the pushing operation is performed, and when the push plate ascends to the first position, a channel is formed below the push plate.

In this way, the push plate can descend from the first position to the second position when the pushing operation needs to be performed, to complete the pushing operation on the workpiece. In addition, the push plate can ascend from the second position to the first position after the pushing operation is completed, to form a channel below the push plate, so that an empty tray or a stacked workpiece queue can flow into and out of the stacking apparatus from the channel without passing through a manipulator or the like. This simplifies a production line device, reduces control steps, and further helps improve production efficiency.

In some embodiments, the at least two shapers are sequentially arranged along the first direction, any two adjacent shapers are configured to be able to approach or move away from each other along the first direction, and the alignment operation is performed through the approaching action.

In this way, workpieces located between two adjacent shapers can be aligned and stacked, so that an operation of aligning workpieces to form a neat workpiece queue is implemented by using a simple structure and a simple action, and a plurality of workpieces can be quickly aligned in a simple and automated manner. This reduces labor costs and improves stacking efficiency.

In some embodiments, the shapers include a first shaper, a second shaper, and a third shaper that are sequentially arranged along the first direction. The first shaper and the second shaper are configured to be able to approach or move away from each other along the first direction. The second shaper and the third shaper are configured to be able to approach or move away from each other along the first direction.

In this way, a plurality of shapers can simultaneously align and stack two groups of workpieces in an automated manner, so that stacking efficiency is effectively improved. In addition, a structure and an action are simple, so that production costs are effectively reduced. In some embodiments, the shapers include a first shaper, a second shaper, a third shaper, and a fourth shaper that are sequentially arranged along the first direction. The first shaper and the second shaper are configured to be able to approach or move away from each other along the first direction. The third shaper and the fourth shaper are configured to be able to approach or move away from each other along the first direction. The second shaper and the third shaper are configured to be able to approach or move away from each other along the first direction. The alignment operation is performed through the approaching action.

In this way, a plurality of shapers can simultaneously align and stack a plurality of groups of workpieces. This helps improve stacking efficiency of the stacking apparatus. In addition, because a plurality of shapers can act in pairs in different combinations, the stacking apparatus is compatible with stacking of workpieces with different sizes and specifications such as a single row of workpieces and double rows of workpieces, and switching between different stacking modes can be implemented without accessory replacement. This improves compatibility of the stacking apparatus and improves stacking efficiency.

In some embodiments, the stacking apparatus further includes a controller. The controller performs control so that the stacking apparatus performs the alignment operation in one of a first alignment mode and a second alignment mode and is able to switch between the first alignment mode and the second alignment mode. In the first alignment mode, the first shaper and the second shaper perform the alignment operation, and/or the third shaper and the fourth shaper perform the alignment operation. In the second alignment mode, the second shaper and the third shaper perform the alignment operation, and the first shaper and the fourth shaper are in a standby state.

In this way, the stacking apparatus has two different alignment modes, so that the stacking apparatus is compatible with stacking of workpieces with different sizes and specifications such as a single row of workpieces and double rows of workpieces, and higher compatibility is achieved. The first shaper and the second shaper perform the alignment operation, and the third shaper and the fourth shaper perform the alignment operation. In this way, the two pairs of shapers can act in parallel, so that stacking efficiency can be improved. In addition, the second shaper and the third shaper can alternatively perform the alignment operation, to implement compatibility with stacking of workpieces with different sizes and specifications from those of workpieces in the first alignment mode. Moreover, the first shaper and the fourth shaper that are located on two sides are at standby positions. Therefore, large action space can be provided for the second shaper and the third shaper, so that double rows of workpieces or workpieces with larger sizes can be stacked, and the first shaper and the fourth shaper do not interfere with the second shaper and the third shaper.

In addition, the stacking apparatus can automatically switch between the two alignment modes through the controller, and compatibility with workpieces with different sizes and specifications can be implemented simply by changing an action combination of the four shapers. Switching is simple, and continuous alignment and stacking operations can be implemented for workpieces with different sizes and shapes, so that an automation degree of the stacking apparatus and production efficiency are higher.

In some embodiments, the first shaper and the fourth shaper are connected to a first screw rod, a first driving apparatus is connected to the first screw rod, and the first shaper and the fourth shaper are driven by the first driving apparatus to move toward each other or move away from each other along the first screw rod. The second shaper and the third shaper are connected to a second screw rod, a second driving apparatus is connected to the second screw rod, and the second shaper and the third shaper are driven by the second driving apparatus to move away from each other or move toward each other along the second screw rod. In the first alignment mode, the first shaper and the fourth shaper are enabled to move toward each other, and the second shaper and the third shaper are enabled to move away from each other, so that the first shaper and the second shaper approach each other and the third shaper and the fourth shaper approach each other, to perform an alignment operation in the first alignment mode. In the second alignment mode, the first shaper and the fourth shaper are enabled to be in a standby state, and the second shaper and the third shaper are enabled to move toward each other, to perform an alignment operation in the second alignment mode.

In this way, the two screw rods are driven so that shapers arranged on each screw rod move relative to each other, to implement a state in which the first shaper and the second shaper perform an action of approaching each other and the third shaper and the fourth shaper perform an action of approaching each other. Therefore, alignment can be easily implemented for a workpiece between the first shaper and the second shaper and for a workpiece between the third shaper and the fourth shaper (for example, the workpiece is centered), without an additional alignment reference. Therefore, reliable alignment in the first alignment mode can be implemented by using a simple structure in an automated manner. In addition, the second shaper and the third shaper arranged on one screw rod are enabled to move close to each other along the screw rod, and the first shaper and the fourth shaper arranged on the other screw rod are enabled to be in a standby state, so that alignment can be easily implemented for a workpiece between the second shaper and the third shaper (for example, the workpiece is centered), without an additional alignment reference. Therefore, reliable alignment in the second alignment mode can be implemented by using a simple structure in an automated manner. In this way, a flexible pairing action of the four shapers is implemented through the two screw rods, with a simple structure and a smart design. In addition, transmission by the screw rods has high transmission efficiency and low energy consumption. This better facilitates energy saving and environmental protection.

In some embodiments, each shaper has a shaping surface facing an adjacent shaper, and the shaping surface is used for contact with the workpiece.

In this way, good alignment can be implemented simply through contact between the shaping surface and the workpiece. A structure is simple, and alignment effect is good. In addition, because the second shaper has a shaping surface facing the first shaper and a shaping surface facing the third shaper and the third shaper has a shaping surface facing the second shaper and a shaping surface facing the fourth shaper, the second shaper and the third shaper can align workpieces through contact between the shaping surfaces and workpieces in both the first alignment mode and the second alignment mode, to obtain a neat workpiece queue through stacking.

In some embodiments, the stacking apparatus further includes a rack. The rack is arranged on the base bracket in a manner of being movable relative to the base bracket, and is configured to be able to move forward or backward along the second direction above the stacking table under driving by a third driving apparatus. The shapers and the push plate are all connected to the rack, and move forward or backward along the second direction together with the rack.

In this way, because the rack can move along the second direction on the base bracket, the rack can reach a position of to-be-stacked workpieces on the stacking table and can also move back to a position at which the rack does not interfere with an action of placing the to-be-stacked workpieces. Therefore, a stacking operation can be flexibly performed. Moreover, the shapers and the push plate can move forward or backward along the second direction together with the rack, to align the workpieces along the second direction. Therefore, the workpieces can be aligned separately along the first direction and the second direction. This improves stacking uniformity and compactness of the workpieces. Moreover, the entire rack is enabled to move forward or backward along the second direction to drive the push plate to move forward or backward, and no complex motion mechanism needs to be additionally arranged to avoid interference between the push plate and the shapers. This further helps improve an automation degree and production efficiency.

In some embodiments, after the shapers perform the alignment operation, the rack is driven by the third driving apparatus to move forward along the second direction, to drive the push plate to perform the pushing operation, and the rack moves backward along the second direction after the push plate performs the pushing operation once with a backward movement distance greater than or equal to a forward movement distance of the rack moving forward along the second direction this time.

In this way, the third driving apparatus enables the rack to move forward by matching a timing of the alignment operation performed by the shapers, so that the push plate can perform the pushing operation on an appropriate occasion, and workpieces properly aligned along the first direction can be further aligned along the second direction. In addition, a gap between adjacent workpieces in the workpiece queue along the second direction is reduced or even eliminated. This helps form a neat and compact workpiece queue through stacking, further helps improve shape retention of the stacked workpiece queue, and also reduces a necessity of aligning and shaping the workpiece queue again in a subsequent procedure. In this way, the push plate is enabled to move backward along the second direction after completing one pushing operation, to continue to stack a next group of workpieces without affecting the workpiece queue already stacked. In addition, the backward movement distance of the rack can be made to be greater than or equal to the forward movement distance of the rack this time, so that starting points and ending points of the forward movement and the backward movement of the rack can be flexibly set. Therefore, flexible design may be performed from the perspectives of reducing an interference risk, reducing action time of each round of alignment and stacking, and the like.

In some embodiments, the stacking apparatus further includes at least one manipulator. The manipulator is configured to place at least one workpiece at a specified position on the stacking table in a specified orientation. The specified position includes a position at which a tray for accommodating the workpiece is located.

In this way, to-be-stacked workpieces can be placed at the specified position on the stacking table in an automated manner. This further reduces labor costs and improves an automation degree of the stacking apparatus. Because the specified position includes the position at which the tray for accommodating the workpiece is located, the to-be-stacked workpieces can be placed on the tray by the manipulator. After the workpieces on the tray are aligned and stacked, the tray can directly flow out of the stacking apparatus to a next procedure. In this way, a stacked workpiece queue can directly flow out of the stacking apparatus together with the tray without passing through the manipulator. This simplifies a production line device, reduces control steps, and further helps improve production efficiency. In addition, a neat workpiece queue formed through stacking is directly sent out by the tray, so that a shape of the workpiece queue can be kept.

In some embodiments, the stacking table includes a conveying guide rail. The conveying guide rail is configured to enable a tray for accommodating the workpiece to enter the stacking table or exit the stacking table along a second direction that intersects with the first direction. A stopper is arranged near one end of the conveying guide rail that is away from the shapers.

In this way, the tray can automatically flow onto and out of the stacking table, and the tray can automatically stop at a specified position. This helps improve an automation degree of the stacking apparatus, improve positioning accuracy for the tray, and improve stacking efficiency and stacking effect for workpieces.

In some embodiments, the stacking table further includes a jacking bracket that is driven by a jacking apparatus to ascend and descend along a third direction that intersects with both the first direction and the second direction. The jacking bracket is configured to enable the tray entering the stacking table to rise or fall. The tray is in a raised state during the alignment operation and the pushing operation.

The jacking apparatus can drive the jacking bracket to detach the tray from the stacking table during the alignment operation and the pushing operation, so that a risk of accidental movement of the tray on the stacking table can be reduced. This helps improve continuous positioning accuracy for the tray and improve alignment accuracy for an entire workpiece queue.

In some embodiments, the jacking bracket includes a synchronous lifter.

In this way, the tray can smoothly ascend and descend. This reduces adverse conditions such as workpiece shifting and workpiece queue shape changes due to inclination of the tray.

In some embodiments, the stacking apparatus further includes a detection apparatus for detecting a quantity of stacked workpieces in the workpiece queue.

In this way, the quantity of stacked workpieces in the stacked workpiece queue can be detected, so that a current stacking status (for example, the quantity of stacked workpieces and a tail position of the workpiece queue) can be learned of, and then accurate control can be performed based on the current stacking status.

In some embodiments, the intersection includes perpendicular intersection.

In this way, a workpiece queue can be stacked along two perpendicular directions on a plane. This is especially suitable for stacking of cuboid-shaped workpieces.

A second aspect of this disclosure provides a battery production line. The battery production line includes at least one stacking apparatus provided in the first aspect of this disclosure and a tray for placing the workpiece.

In this way, workpieces can be quickly and neatly stacked in an automated manner, to achieve higher stacking efficiency and adapt to stacking of batteries with different sizes in a plurality of manners, such as stacking of a single row of batteries and stacking of double rows of batteries. This achieves good compatibility and facilitates flexible production of an entire battery production line. Moreover, two or more stacking apparatuses may alternatively be arranged to share a conveying line channel for conveying to-be-stacked workpieces (to-be-stacked batteries) and cooperate with each other in terms of an action timing, to reduce production takt time. In addition, because the workpieces are placed on the tray, a neatly stacked workpiece queue can be directly sent to a next processing device by using the tray, without transferring the neatly stacked workpiece queue by using another carrying apparatus.

In some embodiments, the workpiece includes at least either of a battery and a battery unit obtained by combining at least two batteries, and the workpiece queue includes at least either of a battery queue formed by arranging a single row of batteries and a battery unit queue formed by arranging battery units.

In this way, the stacking apparatus can be used for stacking batteries and is compatible with battery queues with different specifications, for example, is compatible with a single-row battery queue formed by arranging a single row of batteries and a double-row battery queue formed by arranging double rows of batteries. This improves compatibility (flexibility) of the stacking apparatus and even the entire battery production line, and can further improve production efficiency of battery assembly.

A third aspect of this disclosure provides a stacking method for stacking workpieces into a neat workpiece queue. The stacking method includes: a step of placing a first workpiece; a step of aligning and pushing the first workpiece, where two end faces of the first workpiece along a first direction are pushed, through an alignment operation by shapers that act in pairs, to be aligned with each other, and an end face of the first workpiece along a second direction is pushed by a push plate to perform a pushing operation; an alignment step which enables a subsequent workpiece to be placed in such a way that the subsequent workpiece and the first workpiece face a same direction, where two end faces of the subsequent workpiece along the first direction are pushed through the alignment operation by the shapers, so that the two end faces of the subsequent workpiece along the first direction are aligned with the two end faces of the first workpiece along the first direction; a pushing step, where after the alignment step, an end face of the subsequent workpiece that is farthest away from the first workpiece along the second direction is pushed through a pushing operation by the push plate, so that the subsequent workpiece approaches a workpiece adjacent to the subsequent workpiece along the second direction; and repeating the alignment step and the pushing step until the workpiece queue with a predetermined length is formed through stacking.

Because alignment of a workpiece can be implemented by pushing two end faces of the workpiece from two sides along the first direction, a neat workpiece queue with two end faces aligned along the first direction can be easily formed. After the two end faces of the workpiece along the first direction are aligned, an end face of the last workpiece in the queue along the second direction is further pushed to approach a side of the first workpiece, so that the workpiece queue can further become neat and compact along the second direction. This further improves neatness of the workpiece queue, so that a neat workpiece queue can be formed through stacking.

In some embodiments, the workpiece includes at least either of a battery and a battery unit obtained by combining at least two batteries, and the workpiece queue includes at least either of a battery queue formed by arranging a single row of batteries and a battery unit queue formed by arranging battery units.

In this way, the stacking apparatus can be used for stacking batteries and is compatible with battery queues with different specifications, for example, is compatible with a single-row battery queue formed by arranging a single row of batteries and a double-row battery queue formed by arranging double rows of batteries. This improves compatibility (flexibility) of the stacking apparatus and even the entire battery production line, and can further improve production efficiency of battery assembly.

A fourth aspect of this disclosure provides a stacking method for stacking workpieces into a neat workpiece queue by using the stacking apparatus. The stacking apparatus has a stacking table and shapers. The stacking method includes: a placement step, where to-be-stacked workpieces are placed on a tray carried on the stacking table; an in-place step, where at least two shapers are made to be at ready positions to prepare for an alignment operation, and the shapers are moved forward along a second direction to positions corresponding to the to-be-stacked workpieces; and an alignment step, where shapers that act in pairs are made to perform an action of approaching each other along a first direction until shaping surfaces of the shapers are in contact with the to-be-stacked workpieces, so that the to-be-stacked workpieces are aligned.

In this way, workpieces can be efficiently and neatly stacked in an automated manner by using the stacking apparatus, and compatibility is good.

In some embodiments, the stacking apparatus further includes a rack and a push plate, the shapers and the push plate are all connected to the rack, and the rack is configured to be able to move forward or backward along the second direction above the stacking table. After the alignment step, the stacking method further includes: a pushing step, where the rack provided with the push plate is moved forward along the second direction in a state in which the push plate descends to a second position, until the push plate presses against the workpiece, to perform a pushing operation; and a backward movement step, where the rack is moved backward along the second direction.

In this way, after the alignment operation is performed on the workpieces along the first direction, the pushing operation can be performed on the workpieces by using the stacking apparatus, so that the workpieces are aligned along the second direction. To be specific, a gap between adjacent workpieces in the workpiece queue along the second direction can be reduced or even eliminated, so that a neatly and compactly arranged workpiece queue is obtained. In addition, after one pushing operation is completed, the rack is enabled to move backward along the second direction, so that a next group of to-be-stacked workpieces can be placed.

In some embodiments, the placement step includes: a step of determining whether the stacking table is an empty stacking table, where if it is determined that the stacking table is an empty stacking table, the tray is allowed to flow onto the stacking table; otherwise, the tray is not allowed to flow onto the stacking table; a step of making the tray flow onto the stacking table determined as empty; a step of determining that the tray on the stacking table has reached a specified position; a step of reading information about the tray and determining whether the tray is a tray for a first alignment mode or a tray for a second alignment mode, where the tray for the first alignment mode is configured to carry a first workpiece queue, the tray for the second alignment mode is configured to carry a second workpiece queue, and a length dimension of the second workpiece queue along the first direction is different from a length dimension of the first workpiece queue along the first direction; and a step of placing the to-be-stacked workpieces on the tray.

In the stacking apparatus, whether to allow the tray to flow onto the stacking table is determined based on a result of determining whether the stacking table is an empty stacking table. This can prevent the tray from accidentally entering a stacking table on which there is still another tray. Whether the tray is a tray for the first alignment mode or a tray for the second alignment mode is determined, so that whether the first workpiece queue or the second workpiece queue is to be stacked currently can be easily determined, and an action to be subsequently performed can be easily determined. In addition, because the tray is scheduled according to a production requirement of a downstream procedure of the stacking apparatus, a neat first workpiece queue and second workpiece queue can be formed through stacking according to the production requirement of the downstream procedure. A workpiece is placed on the tray on a basis of determining that the tray on the stacking table has reached the specified position, so that a workpiece can be placed in an accurate and timely manner through timing matching.

In some embodiments, a first shaper, a second shaper, a third shaper, and a fourth shaper are sequentially arranged on the rack along the first direction. The in-place step includes: a step of determining, based on a determining result for the tray, to perform an alignment operation in one of the first alignment mode and the second alignment mode, where if it is determined that the tray is a tray for the first alignment mode, it is determined that an alignment operation is to be performed in the first alignment mode, or if it is determined that the tray is a tray for the second alignment mode, it is determined that an alignment operation is to be performed in the second alignment mode; making, based on a determined alignment mode, the shapers on the rack to be at ready positions to prepare for an alignment operation, where if it is determined that an alignment operation is to be performed in the first alignment mode, the first shaper and the second shaper are made to be at positions away from each other along the first direction and the third shaper and the fourth shaper are made to be at positions away from each other along the first direction, or if it is determined that an alignment operation is to be performed in the second alignment mode, the second shaper and the third shaper are made to be at positions away from each other along the first direction and the first shaper and the fourth shaper are made to be at standby positions; determining whether the first workpiece queue or the second workpiece queue exists on the tray, and if neither of the first workpiece queue and the second workpiece queue exists, performing determining again after the first workpiece is placed, or if the first workpiece queue or the second workpiece queue exists, determining a queue tail position of the first workpiece queue or the second workpiece queue; and making the rack to move forward along the second direction to a position corresponding to the queue tail position.

An alignment mode to be performed is determined by using the stacking apparatus based on a determining result for the tray. Therefore, whether the first workpiece queue or the second workpiece queue is to be stacked currently can be easily determined, and an alignment mode to be performed can be easily determined. In addition, based on the determined alignment mode, the first shaper, the second shaper, the third shaper, and the fourth shaper are correspondingly enabled to be respectively at ready positions to prepare for an alignment operation, so that a required workpiece queue can be accurately stacked according to a production requirement. In addition, whether a workpiece queue exists on the tray is determined. If a workpiece queue exists, a tail position of the workpiece queue is determined, and the rack is further enabled to move forward along the second direction to a position corresponding to the tail position. In this way, the rack, and the shapers, the push plate, and the like that are arranged on the rack can accurately move to corresponding positions, so that an alignment operation can be reliably performed to stack workpieces.

In some embodiments, the tray for the first alignment mode carries two first workpiece queues, and the tray for the second alignment mode carries one second workpiece queue. In the alignment step, shapers that act in pairs on the rack are made, based on the determined alignment mode, to perform an action of approaching each other along the first direction until shaping surfaces of the shapers are in contact with the workpieces, so that the workpieces are aligned. Herein, if it is determined that an alignment operation is to be performed in the first alignment mode, the first shaper and the second shaper perform the approaching action, and the third shaper and the fourth shaper perform the approaching action; or if it is determined that an alignment operation is to be performed in the second alignment mode, the first shaper and the fourth shaper stay at the standby positions, and the second shaper and the third shaper perform the approaching action.

In the stacking apparatus, the first shaper, the second shaper, the third shaper, and the fourth shaper are enabled to respectively perform corresponding actions based on the determined alignment mode, so that two first workpiece queues or one second workpiece queue can be aligned according to a requirement, to form a neat workpiece queue through stacking. This can implement compatibility with stacking of workpieces with different specifications and sizes and workpiece queues in different arrangement modes.

In some embodiments, at least two stacking apparatuses are used, and each stacking apparatus includes a stacking table and a rack. In the step of determining whether the stacking table is an empty stacking table, determining is separately performed for the stacking table in each stacking apparatus. If it is determined that one of the stacking tables is an empty stacking table, the tray is allowed to flow onto the empty stacking table. If it is determined that all the stacking tables are empty stacking tables, the tray is allowed to flow onto any one of the empty stacking tables. If it is determined that all the stacking tables are non-empty stacking tables, the tray is not allowed to flow onto any stacking table.

Two or more stacking apparatuses can share a conveying line channel for conveying to-be-stacked workpieces, and cooperate with each other in terms of an action timing. This reduces production takt time and can further improve stacking efficiency.

In some embodiments, the in-place step, the alignment step, the pushing step, and the backward movement step are separately performed for each stacking apparatus.

A first stacking apparatus and a second stacking apparatus can be used to separately perform stacking operations to form, through stacking, neat workpiece queues corresponding to a production requirement, so that stacking efficiency is high. This helps improve production efficiency of an entire production line. Moreover, the first stacking apparatus and the second stacking apparatus can alternatively cooperate with each other in terms of an action timing to reduce production takt time.

In some embodiments, before the placement step, the stacking method further includes a step of determining that the tray has reached a predetermined position. Herein, the predetermined position is an upstream-side adjacent position relative to the stacking table in a flow path of the tray.

Before the placement step, it is determined that a tray has reached a predetermined position. Therefore, the placement step and even an entire stacking process may be started when a tray reaches a predetermined position. This can improve an automation degree of production control. In addition, a tray can be scheduled in a timely manner according to a production requirement of a downstream procedure of the stacking apparatus, and a stacking operation matching the production requirement can be performed in a timely manner.

In some embodiments, in the step of determining that the tray on the stacking table has reached a specified position, it is determined that the tray has reached the specified position along both the second direction and the third direction.

In this way, to-be-stacked workpieces can be accurately placed at an appropriate position in the tray on the stacking table, and a risk of misoperation is reduced.

In some embodiments, the workpiece includes at least either of a battery and a battery unit obtained by combining at least two batteries, and the workpiece queue includes at least either of a battery queue that is formed by arranging a single row of batteries and that serves as the first workpiece queue and a battery unit queue that is formed by arranging battery units and that serves as the second workpiece queue, where the battery unit is obtained by combining at least two batteries.

In this way, the stacking method in which the stacking apparatus is used can be used for stacking batteries and is compatible with battery queues with different specifications, for example, is compatible with a single-row battery queue formed by arranging a single row of batteries and a double-row battery queue formed by arranging double rows of batteries. This improves compatibility (flexibility) of the stacking method and even a production method for the entire production line, and can further improve production efficiency of battery assembly.

Beneficiary Effects

This disclosure provides a stacking apparatus, a battery production line, and a stacking method, to quickly and neatly stack batteries or stack battery units for battery assembly in an automated manner.

BRIEF DESCRIPTION OF DRAWINGS

Persons of ordinary skill in the art can clearly understand various other advantages and benefits by reading the detailed description of the embodiments below. The accompanying drawings are merely intended to illustrate some embodiments and are not intended to limit this disclosure. Moreover, same reference signs are used to represent same components throughout the accompanying drawings. In the accompanying drawings.

REFERENCE SIGNS ARE DESCRIBED AS FOLLOWS

Figure 1:
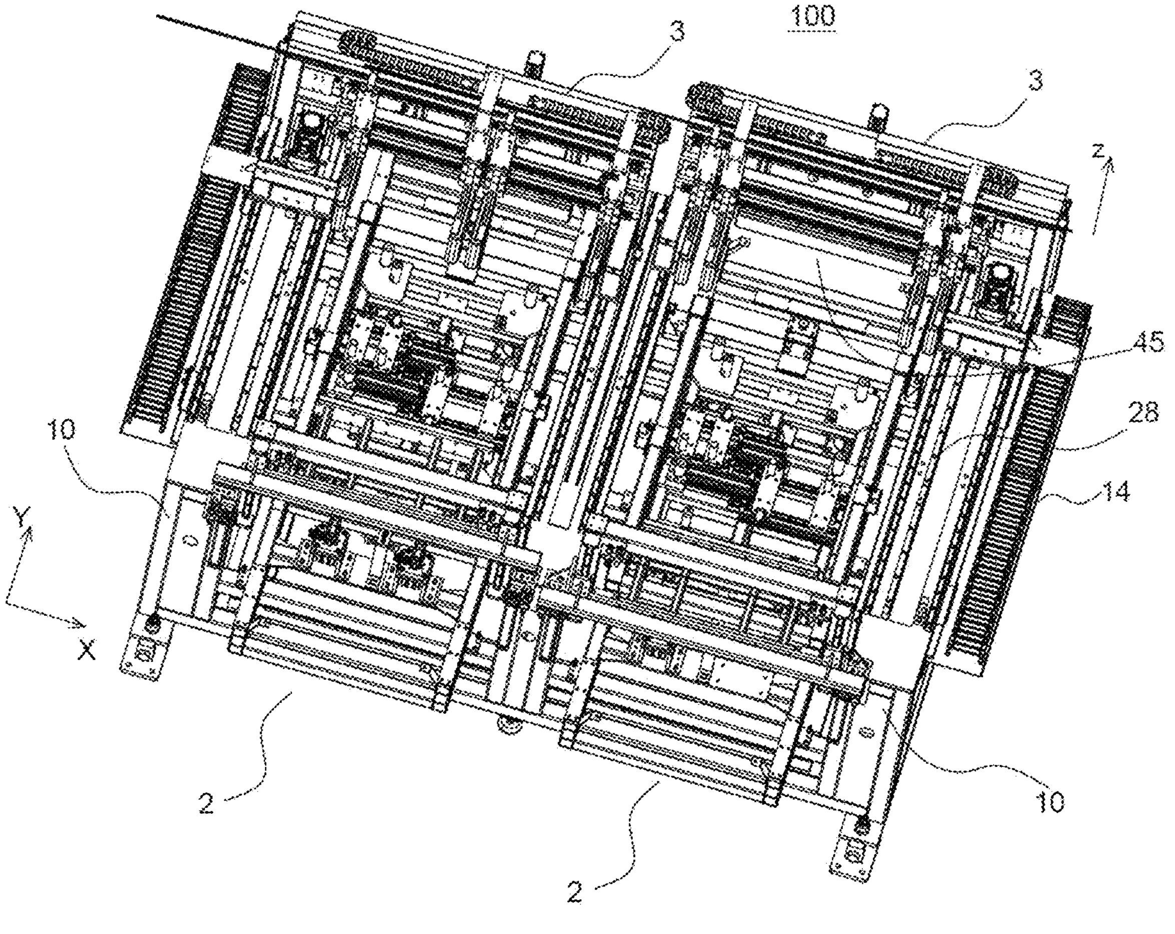
FIG. 1 is a schematic three-dimensional structural diagram of a stacking apparatus according to some embodiments of this disclosure.

1: workpiece; 11: workpiece queue; 10: base bracket; 101: first base bracket; 102: second base bracket; 12: base-side sliding rail; 13: moving track; 14: drag chain; 2: stacking table; 20: stacking table bracket; 21: conveying guide rail; 22: jacking bracket; 23: jacking apparatus; 24: synchronous lifter; 25: positioning pin; 26: stopper; 27: detection apparatus; 28: information reading apparatus; 29: position detection apparatus; 30: bracket; 3: rack; 31: first screw rod; 32: second screw rod; 33: first driving apparatus; 34: second driving apparatus; 35: third driving apparatus; 36: moving portion; 361: meshing member; 362: rack-side first slider; 363: rack-side second slider; 37: moving portion support; 38: rack-side sliding rail; 39: lifting cylinder; 40: lifting guide rail; 4: shaper; 4*a*: shaping surface; 41: first shaper; 42: second shaper; 43: third shaper; 44: fourth shaper; 45: channel; 46: shaping plate; 47: connecting bracket; 48: moving plate; 49: screw rod connecting plate; 50: shaper-side slider; 5: push plate; 5*a*: pushing surface; 51: push plate bracket; 511: first bracket part; 512: second bracket part; 513: third bracket part; 514: push plate-side slider; 52: push plate mounting plate; 6: reference plate; 7: manipulator; 8: tray; 9: fourth driving apparatus; and 100: stacking apparatus.

DESCRIPTION OF EMBODIMENTS

Embodiments of technical solutions of this disclosure are described in detail below with reference to the accompanying drawings. The following embodiments are merely intended for a clearer description of the technical solutions of this disclosure and therefore are used as just examples which do not constitute any limitations on the protection scope of this disclosure.

Unless otherwise defined, all technical and scientific terms used in this specification shall have the same meanings as commonly understood by persons skilled in the art to which this disclosure belongs. The terms used in this specification are merely intended to describe the specific embodiments rather than to limit this disclosure. The terms "include", "have", and any other variations thereof in this disclosure are intended to cover non-exclusive inclusions.

In the description of the embodiments of this disclosure, the technical terms "first", "second", "third", and the like are merely intended to distinguish between different objects, and shall not be understood as any indication or implication of relative importance or any implicit indication of the number, sequence or primary-secondary relationship of the technical features indicated. In the description of the embodiments of this disclosure, "a plurality of" means two or more, unless otherwise explicitly and specifically defined.

An "embodiment" mentioned in this specification indicates that a particular feature, structure, or characteristic described with reference to the embodiment may be included in at least one embodiment of this disclosure. The term appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the description of the embodiments of this disclosure, the term "and/or" is only an associative relationship for describing associated objects, indicating that three relationships may be present. For example, A and/or B may indicate the following three cases: presence of only A, presence of both A and B, and presence of only B. In addition, the character "/" in this specification usually indicates an "or" relationship between the associated objects.

In the description of the embodiments of this disclosure, the orientations or positional relationships indicated by the technical terms "length", "width", "thickness", "upper", "lower", "front", "rear", "left", "right", "vertical", "horizontal", "top", "bottom", "inside", "outside", and the like are based on the orientations or positional relationships as shown in the accompanying drawings. These terms are merely for ease and brevity of description of the embodiments of this disclosure rather than indicating or implying that the means or components mentioned must have specific orientations or must be constructed, manipulated, or used according to specific orientations, and therefore shall not be construed as any limitation on the embodiments of this disclosure.

In the description of the embodiments of this disclosure, unless otherwise specified and defined explicitly, the technical terms "mounting", "connection", "join", "fastening", and the like should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skills in the art can understand specific meanings of these terms in this disclosure as appropriate to specific situations.

In the description of the embodiment of this disclosure, unless otherwise specified and defined explicitly, the technical term "contact" should be understood in its general sense. It may refer to direct contact, contact via an intermediate medium layer, contact with no interaction between two elements that are in contact, or contact with an interaction between two elements that are in contact.

This disclosure is described in detail below.

Currently, new energy batteries are increasingly widely used in life and industry. New energy batteries have been not only used in energy storage power systems such as hydroelectric power plants, thermal power plants, wind power plants, and solar power plants, but also widely used in many other fields including electric transportation tools such as electric bicycles, electric motorcycles, and electric vehicles, and aerospace. With the continuous expansion of application fields of traction batteries, market demands for traction batteries are also increasing.

During battery manufacturing, batteries or battery units need to be stacked and shaped, so that the batteries or the battery units can be arranged neatly and aligned with each other, to meet requirements for a battery queue or a battery module in terms of outline sizes, arrangement uniformity, and the like. In addition, batteries or battery units that are neatly arranged at a stacking station help simplify subsequent operations such as pressurizing a battery queue or a battery unit queue and pasting a heat exchange plate, and help simplify a corresponding processing device. Moreover, neatly arranging a battery queue or a battery unit queue before assembly helps improve compactness of a battery module, and finally helps improve volume utilization of batteries.

To adapt to different product requirements, battery manufacturers usually need to manufacture battery products with a plurality of specifications. Therefore, there are a plurality of battery assembly forms, for example, a form in which a single row of battery cells are assembled (this is sometimes also referred to as a "single-row module"), or a form in which two or more battery cells are bonded to form a battery unit and then a plurality of battery units are arranged and assembled (this is sometimes also referred to as a "double-row module" or a "multi-row module"). To improve production efficiency, a battery queue is sometimes stacked based on a designed battery assembly form. However, currently, an apparatus for stacking batteries or battery units can perform stacking only in one arrangement form among the single-row module, the double-row module, and the multi-row module. If battery modules in different arrangement forms need to be stacked, the stacking apparatus or even a production line needs to be stopped for replacing an accessory, resetting a processing parameter, or the like. Operations are troublesome, time-consuming, and labor-intensive. This is not conducive to improvement of a degree of production automation or improvement of production efficiency. Moreover, processing tool accessories and the like that are suitable for battery modules in different arrangement forms further need to be prepared, and a large amount of tool accessory storage space is required in a production line. This is not conducive to reduction of production costs.

In view of the problems in the foregoing related technologies, this disclosure provides a stacking apparatus. The stacking apparatus is configured to stack workpieces into a neat workpiece queue, where the workpiece queue includes a plurality of workpieces. The stacking apparatus includes a base bracket, a stacking table, and at least two shapers. The stacking table is configured to carry at least one workpiece. The stacking table is arranged on the base bracket. The at least two shapers are arranged on the base bracket, and the shapers act in pairs to perform an alignment operation for aligning workpieces on the stacking table. Paired shapers are configured in such a way that at least one of the actions enables the paired shapers to approach or move away from each other along a first direction above the stacking table, and the alignment operation is performed through the approaching action of the shapers.

The stacking apparatus in the embodiment of this disclosure can quickly and neatly stack workpieces in an automated manner. This reduces labor costs and improves stacking efficiency. In addition, center lines of workpieces are aligned through an action of two shapers approaching each other along the first direction, so that two end faces of each workpiece are aligned. The shapers for implementing the alignment operation have simple structures and actions, and require a few components. This effectively reduces difficulty in assembling the stacking apparatus and reduces production costs. Moreover, a stroke by which shapers acting in pairs approach or move away from each other (namely, a distance between two shapers) can be adjusted to adapt to workpieces with different sizes (including a battery queue formed by arranging a single row of batteries, and a battery unit queue formed by arranging battery units). Neat workpiece queues with different sizes can be formed through stacking along the first direction, without shutdown for accessory replacement. This achieves higher compatibility and better facilitates flexible production.

The stacking apparatus in the embodiments of this disclosure may be used in a battery production process, for example, used for stacking batteries or battery units. Certainly, persons skilled in the art should understand that the stacking apparatus provided in the embodiments of this disclosure is not only used for stacking various workpieces in a battery manufacturing process, but also can be used for stacking other workpieces that need to be stacked.

The following describes some embodiments of this disclosure in detail with reference to FIG. 1 to FIG. 18.

Figure 2:
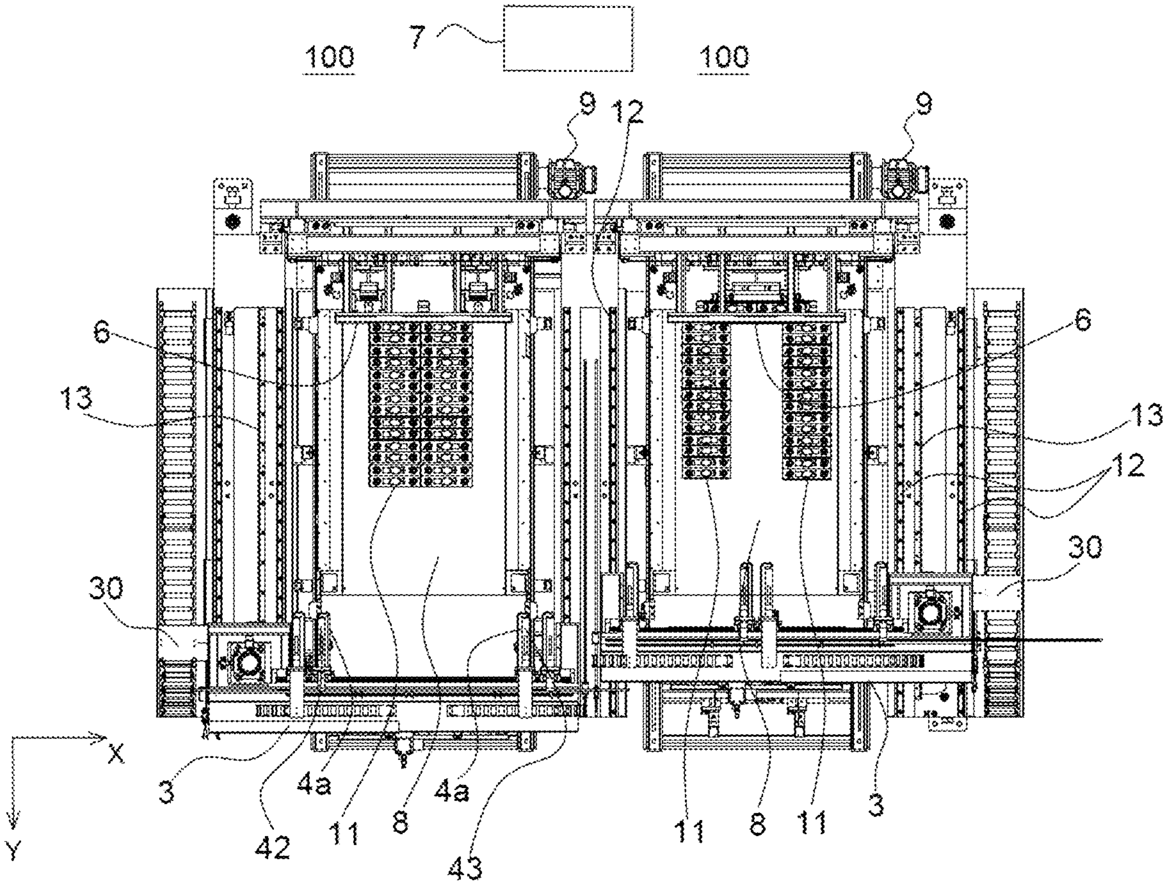
FIG. 2 is a schematic plan view of a stacking apparatus carrying a tray and a workpiece queue according to some embodiments of this disclosure.
Figure 3:
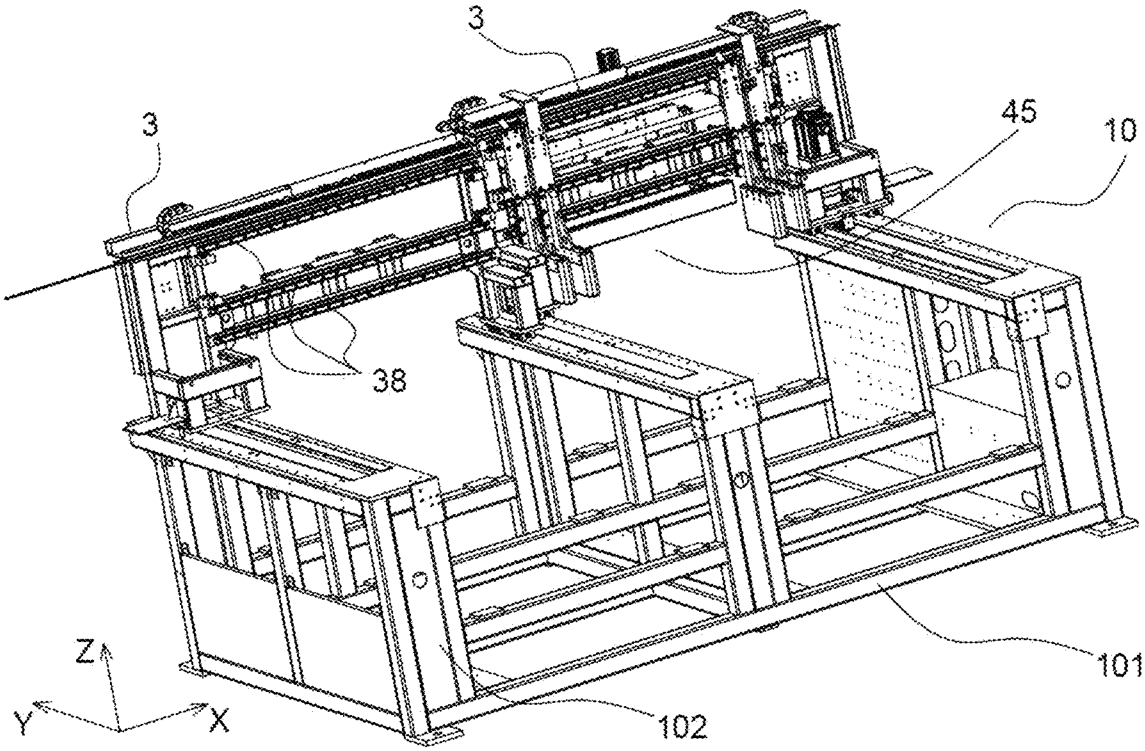
FIG. 3 is a schematic structural diagram of a stacking apparatus in a state in which some components are removed according to some embodiments of this disclosure.
Figure 4:
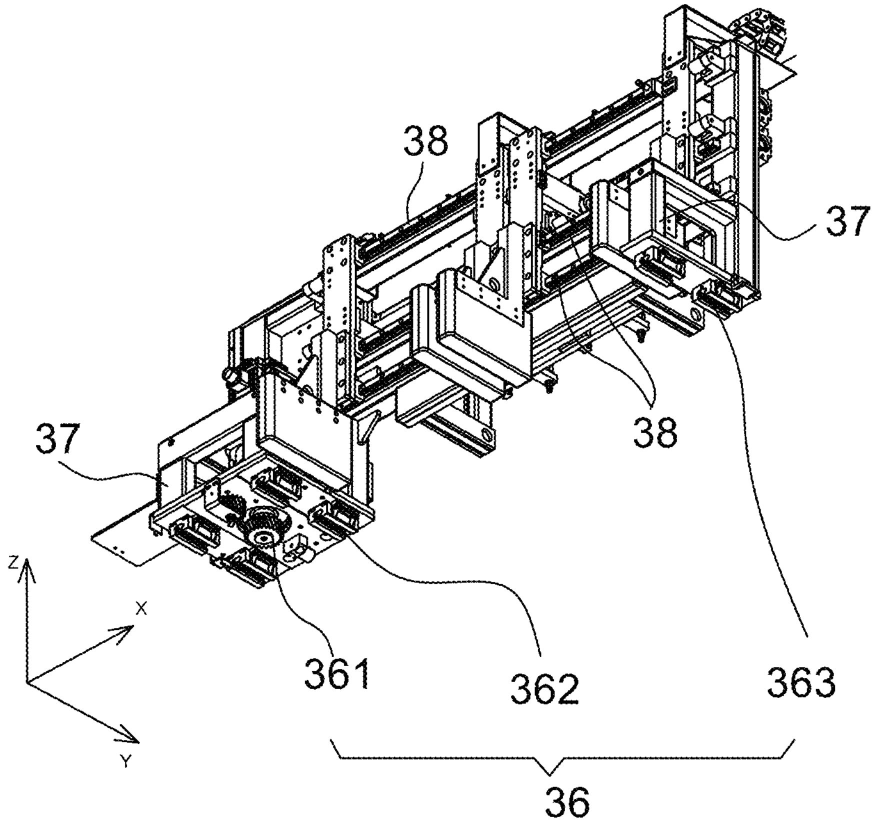
FIG. 4 is a schematic structural diagram of a rack of a stacking apparatus according to some embodiments of this disclosure.
Figure 5:
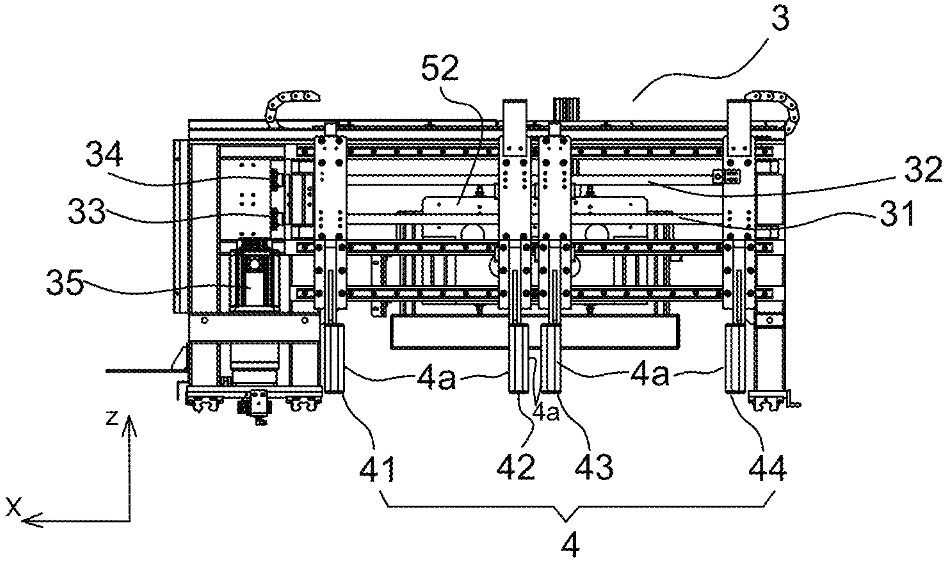
FIG. 5 is another schematic structural diagram of a rack of a stacking apparatus according to some embodiments of this disclosure.
Figure 6:
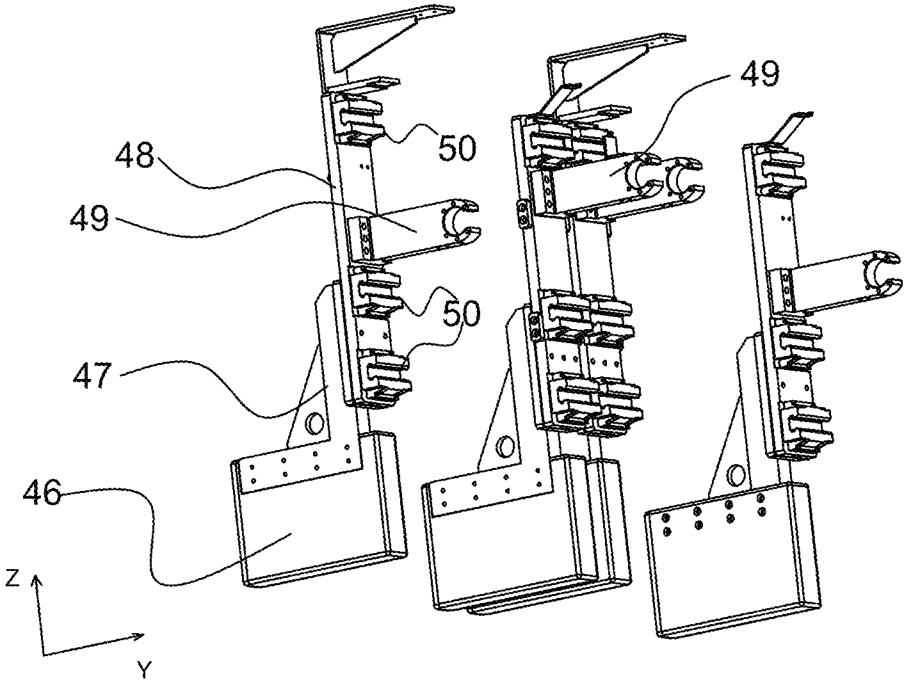
FIG. 6 is a schematic structural diagram of shapers of a stacking apparatus according to some embodiments of this disclosure.
Figure 7:
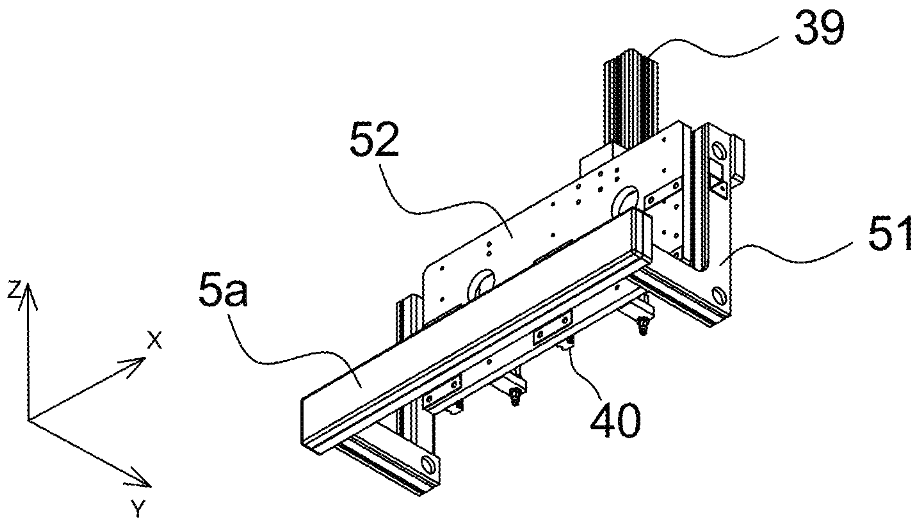
FIG. 7 is a schematic three-dimensional structural diagram of a push plate of a stacking apparatus and surrounding structures according to some embodiments of this disclosure.
Figure 8:
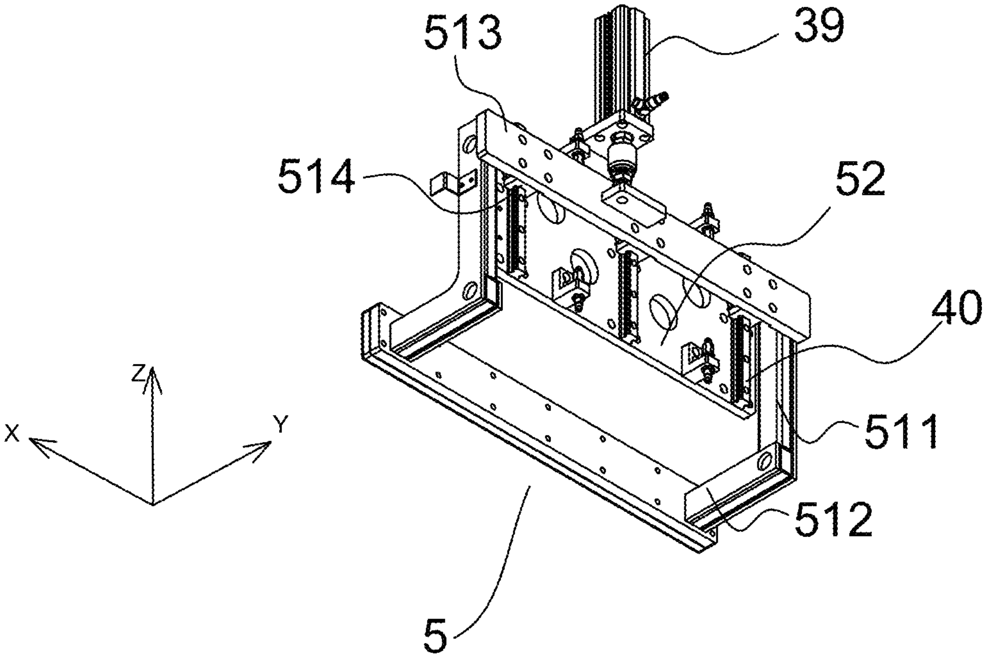
FIG. 8 is another schematic three-dimensional structural diagram of a push plate of a stacking apparatus and surrounding structures according to some embodiments of this disclosure.
Figure 9:
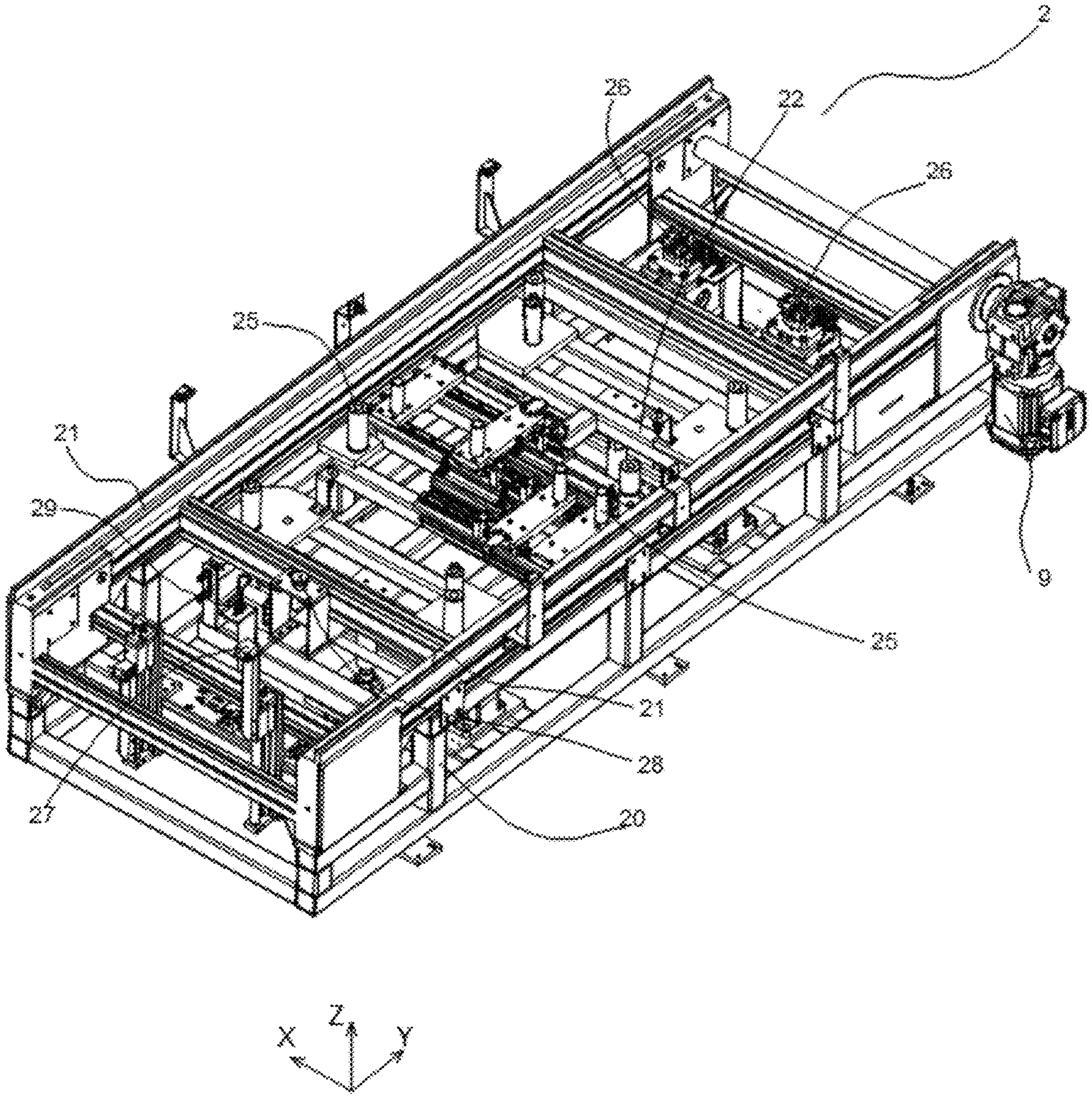
FIG. 9 is a schematic three-dimensional structural diagram of a stacking table of a stacking apparatus according to some embodiments of this disclosure.
Figure 10:
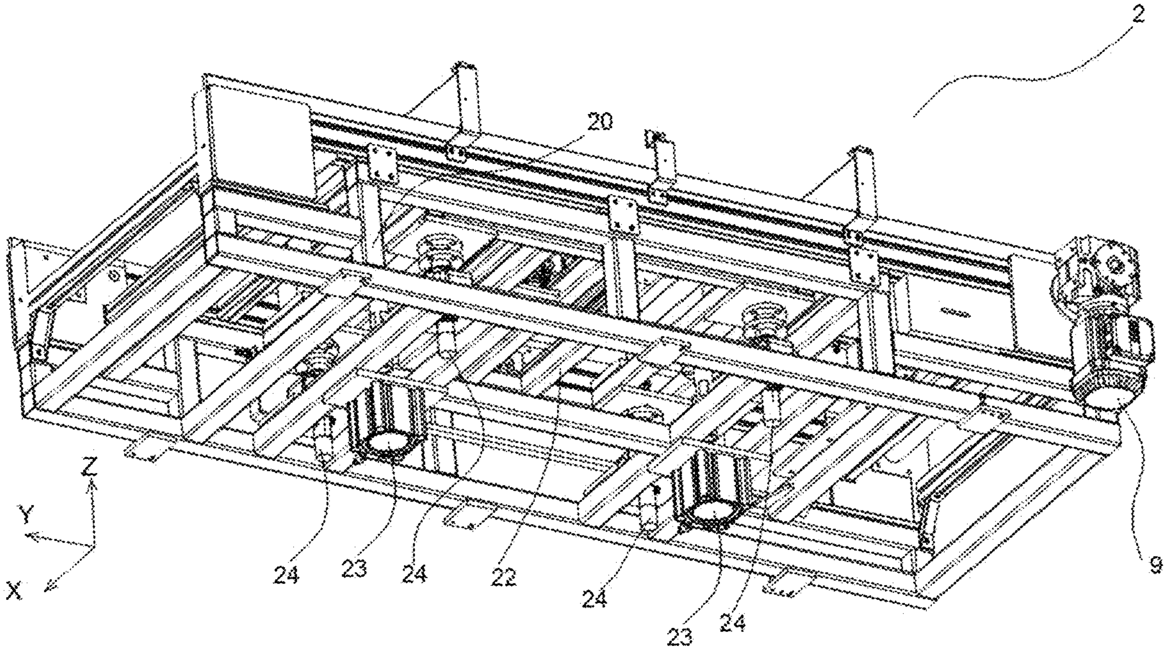
FIG. 10 is another schematic three-dimensional structural diagram of a stacking table of a stacking apparatus according to some embodiments of this disclosure.
Figure 11:
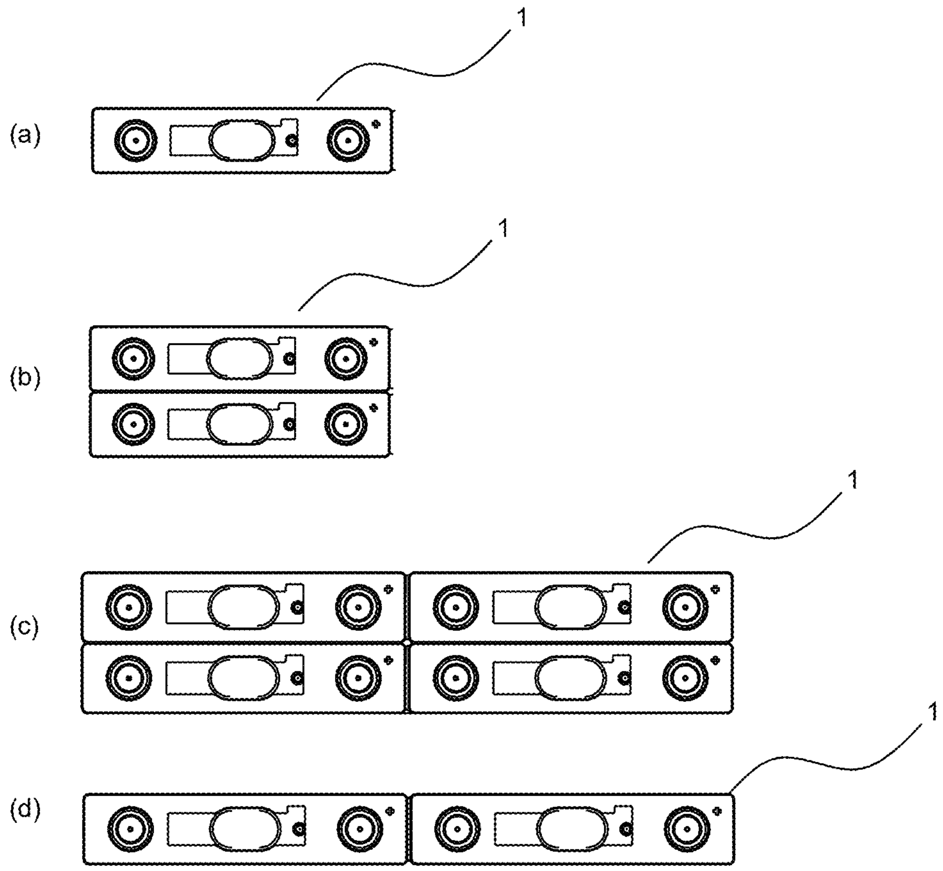
FIG. 11 is a schematic plan view of workpieces to which a stacking apparatus is applicable according to some embodiments of this disclosure, where (a) to (d) respectively show workpieces in different forms.
Figure 12:
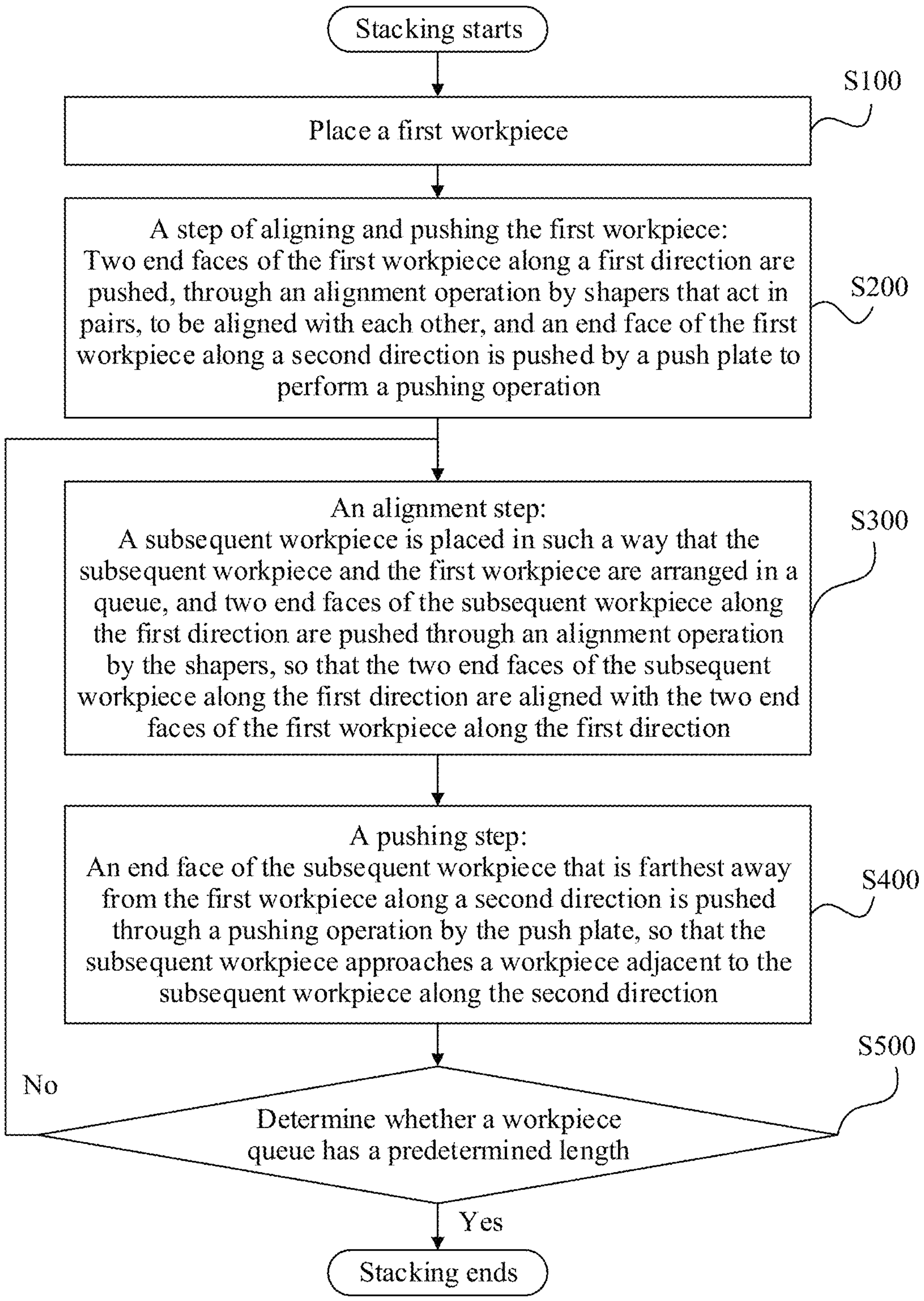
FIG. 12 is a schematic flowchart of a stacking method according to some embodiments of this disclosure.
Figure 13:
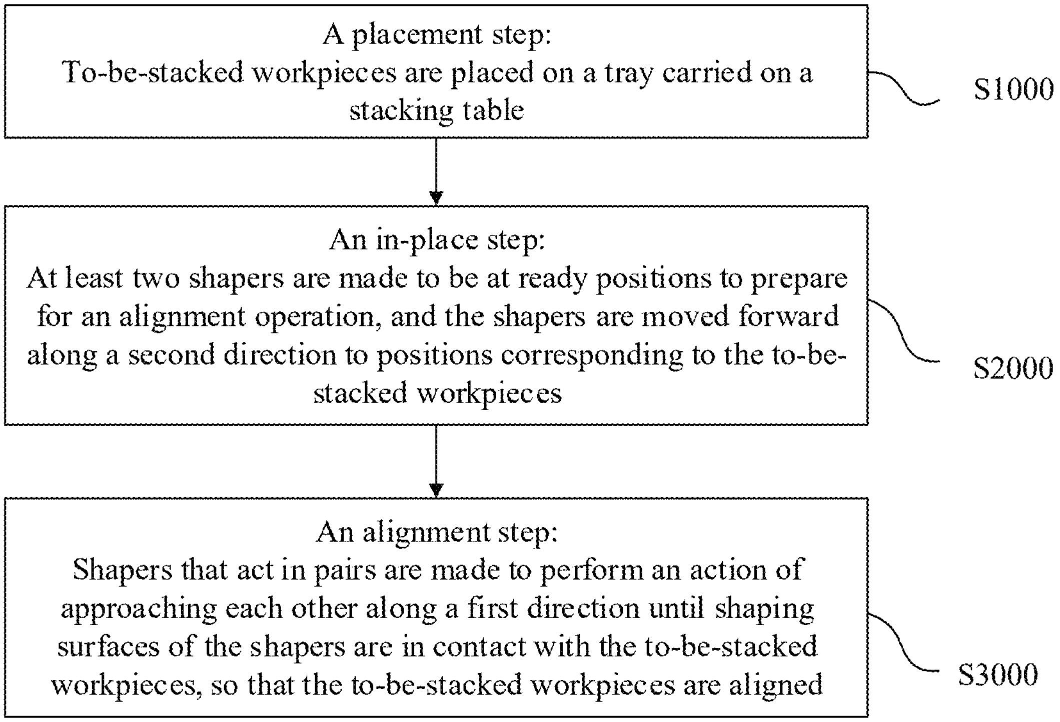
FIG. 13 is another schematic flowchart of a stacking method according to some embodiments of this disclosure.
Figure 14:
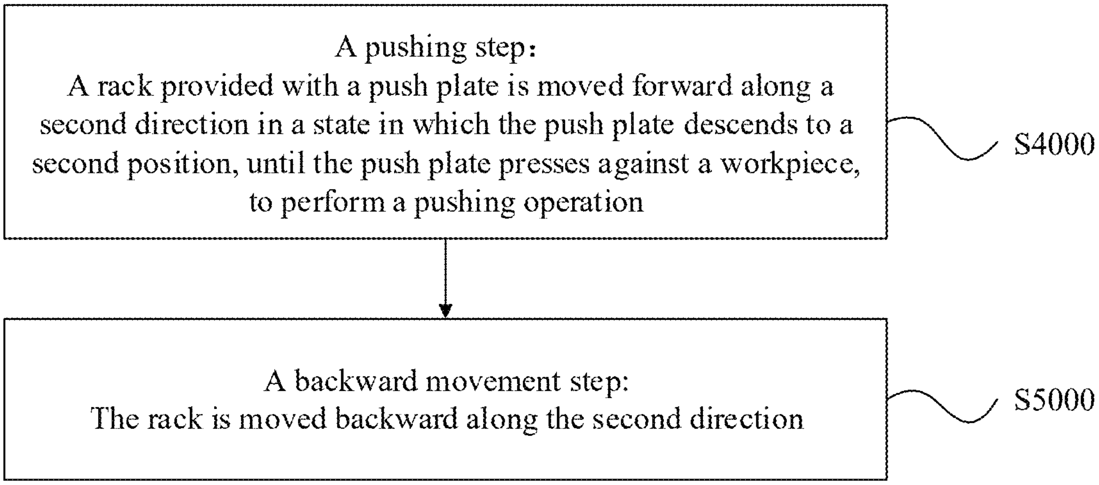
FIG. 14 is still another schematic flowchart of a stacking method according to some embodiments of this disclosure.
Figure 15:
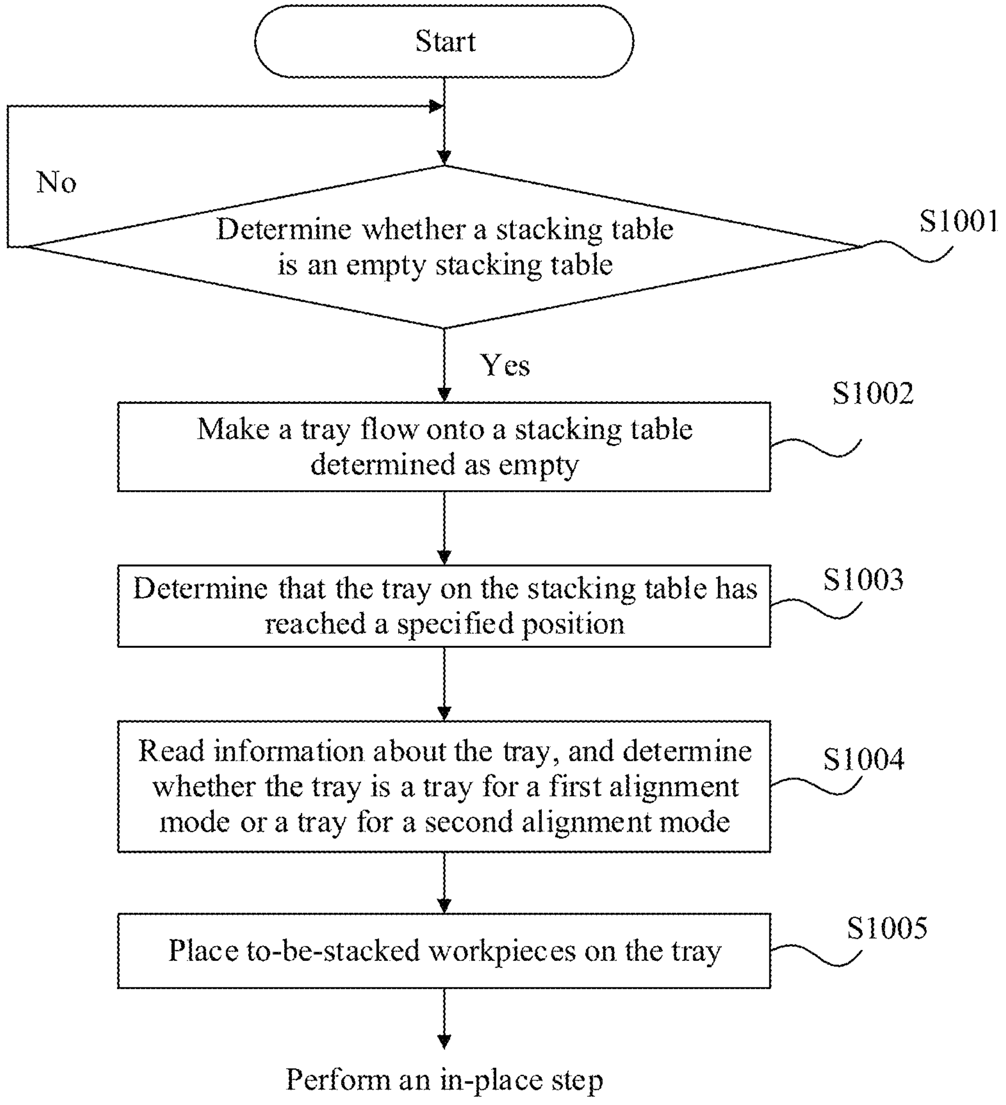
FIG. 15 is a schematic flowchart of a placement step according to some embodiments of this disclosure.
Figure 16:
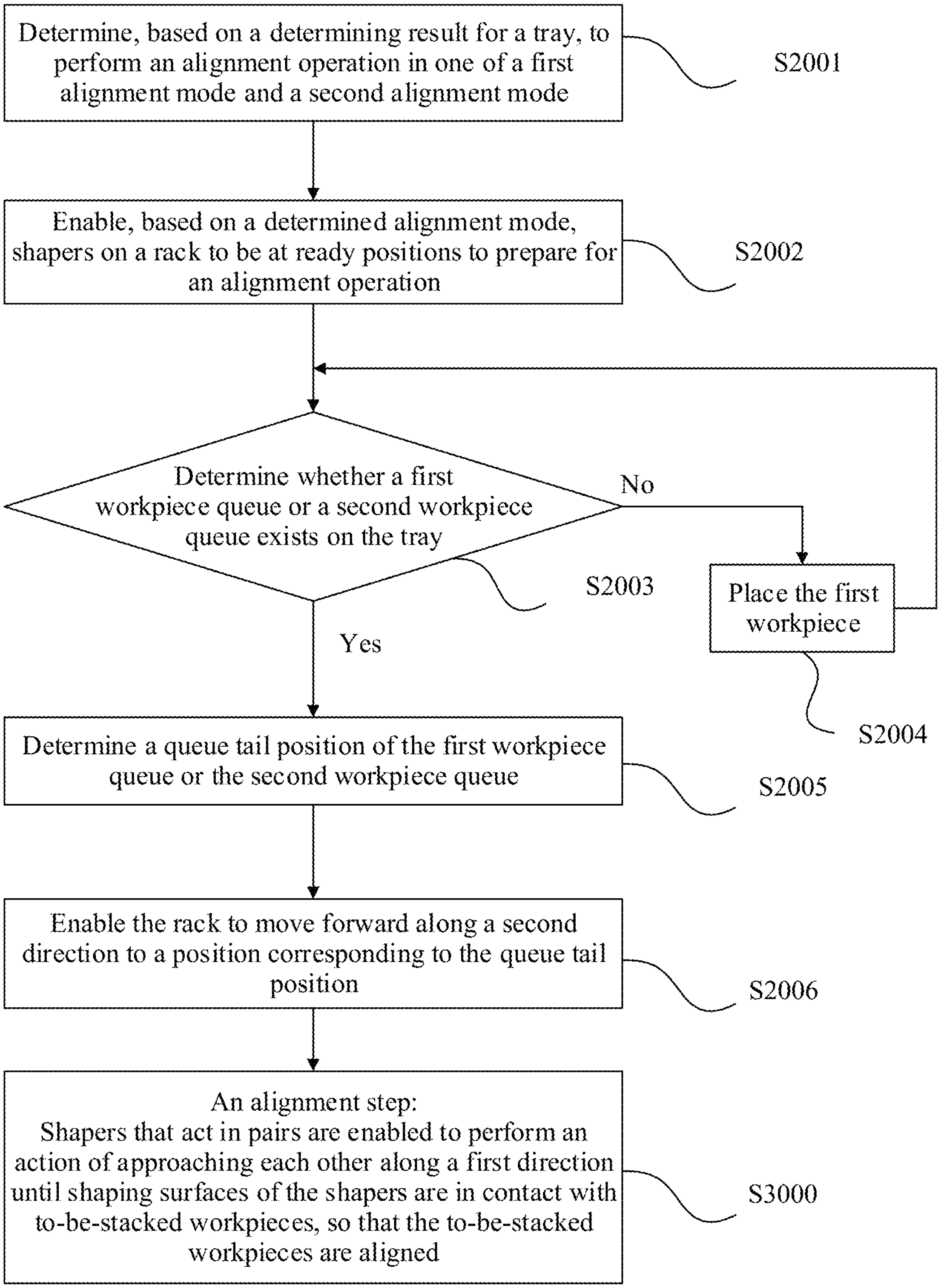
FIG. 16 is a schematic flowchart of an in-place step and an alignment step according to some embodiments of this disclosure.
Figure 17:
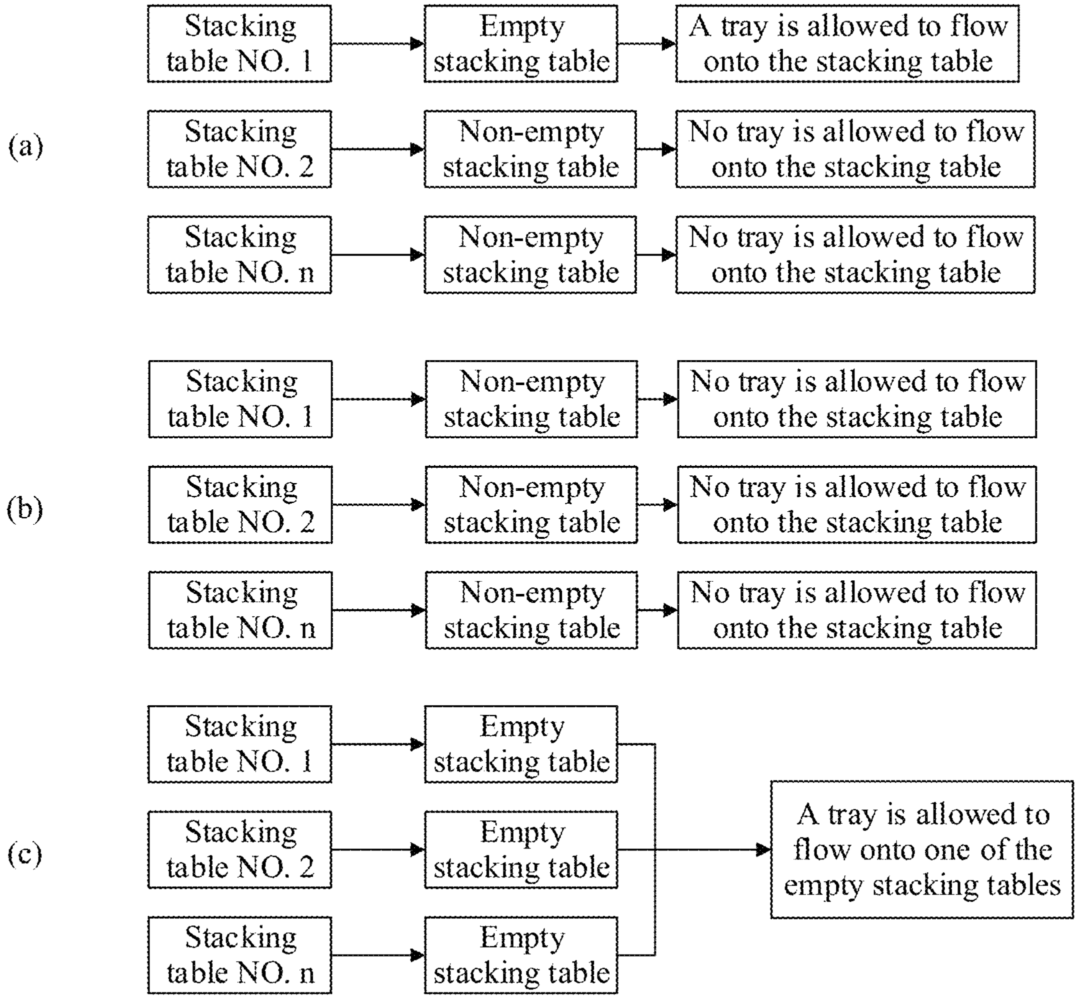
FIG. 17 is a schematic diagram of specific actions for selecting an empty stacking table according to some embodiments of this disclosure.
Figure 18:
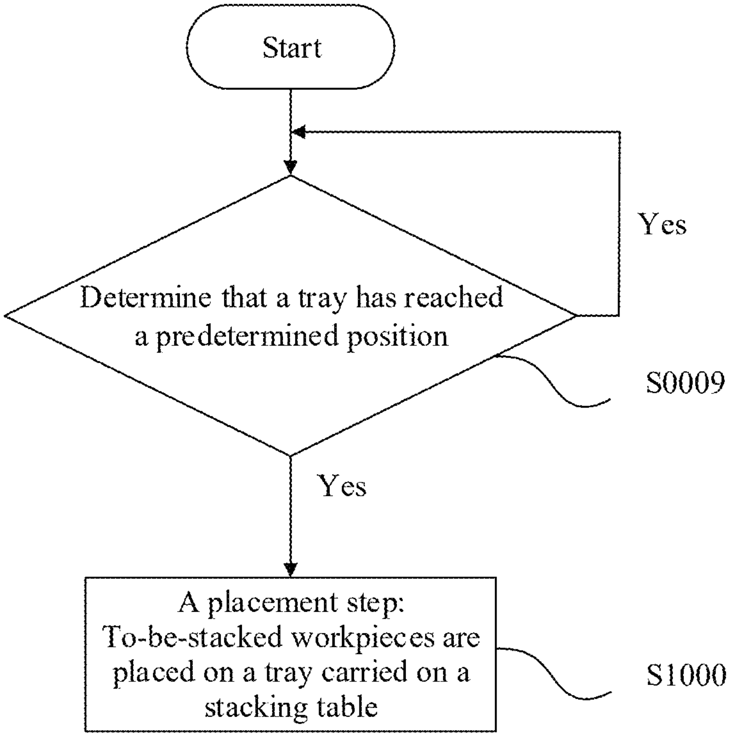
FIG. 18 is yet another schematic flowchart of a stacking method according to some embodiments of this disclosure.

FIG. 1 is a schematic three-dimensional structural diagram of a stacking apparatus according to some embodiments of this disclosure. FIG. 2 is a schematic plan view of a stacking apparatus carrying a tray and a workpiece queue according to some embodiments of this disclosure. FIG. 3 is a schematic structural diagram of a stacking apparatus in a state in which some components are removed according to some embodiments of this disclosure. FIG. 4 is a schematic structural diagram of a rack of a stacking apparatus according to some embodiments of this disclosure. FIG. 5 is another schematic structural diagram of a rack of a stacking apparatus according to some embodiments of this disclosure. FIG. 6 is a schematic structural diagram of shapers of a stacking apparatus according to some embodiments of this disclosure. FIG. 7 is a schematic three-dimensional structural diagram of a push plate of a stacking apparatus and surrounding structures according to some embodiments of this disclosure. FIG. 8 is another schematic three-dimensional structural diagram of a push plate of a stacking apparatus and surrounding structures according to some embodiments of this disclosure. FIG. 9 is a schematic three-dimensional structural diagram of a stacking table of a stacking apparatus according to some embodiments of this disclosure. FIG. 10 is another schematic three-dimensional structural diagram of a stacking table of a stacking apparatus according to some embodiments of this disclosure. FIG. 11 is a schematic plan view of workpieces to which a stacking apparatus is applicable according to some embodiments of this disclosure, where (a) to (d) respectively show workpieces in different forms. FIG. 12 is a schematic flowchart of a stacking method according to some embodiments of this disclosure. FIG. 13 is another schematic flowchart of a stacking method according to some embodiments of this disclosure. FIG. 14 is still another schematic flowchart of a stacking method according to some embodiments of this disclosure. FIG. 15 is a schematic flowchart of a placement step according to some embodiments of this disclosure. FIG. 16 is a schematic flowchart of an in-place step and an alignment step according to some embodiments of this disclosure. FIG. 17 is a schematic diagram of specific actions for selecting an empty stacking table according to some embodiments of this disclosure. FIG. 18 is yet another schematic flowchart of a stacking method according to some embodiments of this disclosure.

In some embodiments of this disclosure, for ease of description, a first direction, a second direction, and a third direction are specified, and the first direction, the second direction, and the third direction are directions that intersect with each other. Herein, the intersecting with each other includes perpendicularly intersecting with each other. For ease of understanding the embodiments of this disclosure, in embodiments shown in FIG. 1 to FIG. 10, an example in which the first direction, the second direction, and the third direction are directions perpendicularly intersecting with each other is used for description. However, persons skilled in the art should understand that the embodiments of this disclosure are not limited to the case in which the three directions perpendicularly intersect with each other. For ease of description, as indicated by arrows in FIG. 1 to FIG. 9, a direction indicated by an arrow X is the first direction, a direction indicated by an arrow Y is the second direction, and a direction indicated by an arrow Z is the third direction. Sometimes, a direction indicated by the arrow Z along the third direction is referred to as "above", and an opposite direction is referred to as "below".

As shown in FIG. 1 and FIG. 2, the embodiments of this disclosure provide a stacking apparatus 100. The stacking apparatus 100 is configured to stack workpieces 1 into a neat workpiece queue 11, where the workpiece queue 11 includes a plurality of workpieces 1. The stacking apparatus 100 includes a base bracket 10, a stacking table 2, and at least two shapers 4. The stacking table 2 is configured to carry at least one workpiece 1. The stacking table 2 is arranged on the base bracket 10. At least two shapers 4 are arranged on the base bracket 10, and the shapers 4 act in pairs to perform alignment operation for aligning workpieces 1 on the stacking table 2. Paired shapers 4 are configured in such a way that at least one of the actions enables the paired shapers 4 to approach or move away from each other along the first direction above the stacking table 2, and the alignment operation is performed through the approaching action of the shapers 4.

During manufacturing of a product such as batteries, batteries or battery units need to be stacked into a neat queue, to help quickly perform subsequent processing such as battery pressurization, assembly, and packaging. The "stacking" in the embodiments of this disclosure includes an action of enabling workpieces placed close to each other to form a queue that is neatly arranged at least along one of extension directions of the queue. The being neatly arranged includes at least one of the following alignment conditions: End faces, on a same side, of workpieces are aligned, center lines of workpieces are aligned, and the like. The stacking apparatus 100 in the embodiments of this disclosure is an apparatus capable of implementing a stacking action.

In some embodiments of this disclosure, as shown in FIG. 11, the workpiece 1 may include, for example, a battery, or a battery unit obtained by combining at least two batteries. Certainly, in some other embodiments, the workpiece 1 may alternatively include other workpieces that need to be stacked. A prismatic battery shown in (a) of FIG. 11 is used as an example. A battery unit obtained by combining at least two batteries of the foregoing type may be a battery unit obtained by joining large surfaces of two batteries, as shown in (b) of FIG. 11; or may be a battery unit obtained by joining side surfaces of two batteries, as shown in (d) of FIG. 11; or may be a battery unit obtained by joining four batteries in pairs, as shown in (c) of FIG. 11. Certainly, neither a workpiece unit nor a battery unit is limited to the forms shown in FIG. 11. A manner of combining at least two batteries is not limited to the joining either, and may alternatively be other manners such as a mechanical connection.

In some embodiments of this disclosure, as shown in FIG. 2, the workpiece queue 11 may include, for example, a battery queue formed by arranging a single row of batteries, or a battery unit queue formed by arranging battery units. Certainly, in some other embodiments, the workpiece queue 11 may alternatively include queues formed by arranging other workpieces.

In the embodiments of this disclosure, the battery may be a battery cell.

The battery cell may be a secondary battery. The secondary battery is a battery cell that can be charged after being discharged to activate active materials for continuous use.

The battery cell may be a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead battery, or the like. This is not limited in the embodiments of this disclosure.

Although not shown in the figures, the battery cell usually includes an electrode assembly. The electrode assembly includes a positive electrode, a negative electrode, and a separator. During charging and discharging of the battery cell, active ions (such as lithium ions) intercalate and deintercalate back and forth between the positive electrode and the negative electrode. The separator is arranged between the positive electrode and the negative electrode to prevent short circuit of the positive electrode and the negative electrode and to allow the active ions to pass through.

In some implementations, the battery cell further includes an electrolyte, and the electrolyte migrates ions between the positive electrode and the negative electrode. A type of the electrolyte is not specifically limited in this disclosure, and the electrolyte may be selected according to a requirement. The electrolyte may be in a liquid state, a gel state, and a solid state.

In some embodiments, the battery cell may include a housing. The housing is configured to encapsulate the electrode assembly, the electrolyte, and other components. The housing may be a steel housing, an aluminum housing, a plastic housing (for example, polypropylene), a composite metal housing (for example, a copper-aluminum composite housing), an aluminum-plastic film, or the like.

In an example, the battery cell may be a cylindrical battery cell, a prismatic battery cell, a pouch battery cell, or a battery cell in another shape. The prismatic battery cell includes a square shell battery cell, a blade battery cell, and a polygonal battery. The polygonal battery is, for example, a hexagonal battery. This is not particularly limited in this disclosure.

In some embodiments, the housing includes a cover and a shell, where the shell is provided with an opening, and the cover closes the opening to form a closed space for accommodating the electrode assembly and substances such as the electrolyte. The shell may be provided with one or more openings. One or more covers may also be provided.

In some implementations, the housing is provided with at least one electrode terminal, and the electrode terminal is electrically connected to a tab. The electrode terminal may be directly connected to the tab or indirectly connected to the tab through an adapter. The electrode terminal may be provided on the cover or may be provided on the shell.

In some implementations, the housing is provided with a pressure relief mechanism. The pressure relief mechanism is configured to relieve internal pressure of the battery cell.

In the embodiments of this disclosure, the battery may alternatively be a single physical module that includes one or more battery cells for providing a higher voltage and capacity. When there are a plurality of battery cells, the plurality of battery cells are connected in series, in parallel, or in series-parallel through a busbar.

The stacking apparatus 100 in the embodiments of this disclosure is described with reference to the accompanying drawings. As shown in FIG. 1 to FIG. 5, the stacking apparatus 100 includes a base bracket 10, a stacking table 2, and at least two shapers 4. The stacking table 2 and the shapers 4 are all arranged on the base bracket 10. In FIG. 3, the base bracket 10 is shown, and some components are omitted for ease of observation.

For example, as shown in FIG. 3, the base bracket 10 includes a first base bracket 101 and two second base brackets 102 that are connected to the first base bracket 101, and the second base brackets 102 are arranged upright along the third direction. The stacking table 2 is supported by the first base bracket 101 and is located between the two second base brackets 102.

In the embodiment shown in FIG. 3, two stacking apparatuses 100 are arranged side by side and share the base bracket 10. To be specific, three second base brackets 102 arranged at equal spacings along the first direction are connected to the first base bracket 101, and a second base bracket 102 located in the middle is shared by the stacking apparatuses. In addition, the stacking table 2 is located in a space between two adjacent second base brackets 102 among the three second base brackets 102. Therefore, there are also two stacking tables 2 arranged side by side.

The stacking table 2 is configured to carry the workpiece 1 and the workpiece queue 11, and provide a placement platform for them. Specifically, the stacking table 2 is configured to carry, for example, to-be-stacked workpieces (workpieces that have not been aligned), or a stacked workpiece queue and workpieces that have not been stacked, or workpiece queues that have been all stacked. The stacking table 2 may directly carry the workpiece 1 and the workpiece queue 11, or may carry the workpiece 1 and the workpiece queue 11 through a tray or a similar structure. When the stacking table 2 directly carries the workpiece 1 and the workpiece queue 11, to-be-stacked workpieces may be placed on the stacking table 2, for example, by a manipulator or manually, and the neatly stacked workpiece queue 11 may be moved from the stacking table 2 by a mechanical gripper and transported to another position. When the stacking table 2 carries the workpiece 1 and the workpiece queue 11 through a tray 8 (details are described below), to-be-stacked workpieces may be placed on the tray 8, for example, by a manipulator or manually, and the neatly stacked workpiece queue 11 may be moved together with the tray 8 and transported from the stacking table 2 to another position.

In addition, it should be noted that two stacking apparatuses 100 arranged side by side are shown in FIG. 1 to FIG. 3. However, the stacking apparatus 100 in the embodiments of this disclosure is not limited to the form of two stacking apparatuses 100 arranged side by side. Instead, only one stacking apparatus 100 may be mounted, or three or more stacking apparatuses may be mounted. Unless otherwise specified, either of the two stacking apparatuses 100 is used herein as an example for description with reference to the accompanying drawings.

The shapers 4 are arranged on the base bracket 10, and a stacking operation may be performed on workpieces on the stacking table 2 by using the shapers 4 and the like.

As shown in FIG. 3, the stacking apparatus 100 further includes a rack 3. The rack 3 is arranged on the base bracket 10. Two moving portions (described below) of the rack 3 are respectively arranged above the two second base brackets 102 of the base bracket 10. Because the two stacking apparatuses 100 share the base bracket 10, moving portions (described below) of a racks 3 of each of the two stacking apparatuses 100 are separately arranged above the second base brackets 102, where two moving portions (the two moving portions respectively belong to two racks) are arranged above the shared second base bracket 102.

In the embodiments of this disclosure, the shapers 4 are connected to the rack 3, so that the shapers 4 can be indirectly arranged on the base bracket 10 through the rack 3. Certainly, in some other embodiments, the shapers 4 may alternatively be directly arranged on the base bracket 10.

Specifically, as shown in FIG. 1 to FIG. 3, the rack 3 is arranged across a position at which the stacking table 2 is located and is above the stacking table 2. As shown in FIG. 3 to FIG. 5, the at least two shapers 4 in the embodiments of this disclosure are held on the rack 3, and the shapers 4 act in pairs. Paired shapers 4 can approach or move away from each other along the first direction. To stack to-be-stacked workpieces 1 placed on the stacking table 2, paired shapers 4 approach each other along the first direction above the stacking table 2 until they are in contact with surfaces of a workpiece 1 between the two shapers 4 acting in pairs, and apply a specific pushing force to the surfaces of the workpiece 1, to align a center line of the workpiece 1 with a middle position of each of the paired shapers 4, so that an alignment operation on the workpiece 1 is implemented. Therefore, even if all workpieces to be aligned are not aligned at the same time but are separately aligned a plurality of times, all workpieces 1 can be aligned with each other to form the neatly stacked workpiece queue 11. With this design, a stacking operation can be performed in a timely manner on a workpiece 1 that arrives, without waiting until all workpieces used to form a workpiece queue arrive and then starting a stacking operation. This helps improve production efficiency. Moreover, because an alignment operation on a workpiece 1 is implemented by aligning a center line of the workpiece 1 with a middle position of each of paired shapers 4, no mechanical part needs to additionally arranged as an alignment reference. This helps simplifies an apparatus structure.

For example, two or more to-be-stacked workpieces 1 may be placed on the stacking table 2, and shapers 4 acting in pairs perform an action of approaching each other once to stack the to-be-stacked workpieces 1 into a neat workpiece queue 11.

Each time a to-be-stacked workpiece is aligned, the shapers 4 may further move away from each other along the first direction, so that the shapers 4 do not interfere with a next action of placing a to-be-stacked workpiece. Therefore, the alignment operation can be smoothly repeated to quickly form a neatly arranged workpiece queue through stacking.

For example, two or more to-be-stacked workpieces 1 may be placed on the stacking table 2, and shapers 4 acting in pairs repeatedly perform an action of approaching each other a plurality of times to stack the to-be-stacked workpieces 1 into a neat workpiece queue 11.

For another example, one or more to-be-stacked workpieces 1 may be placed on the stacking table 2, and shapers 4 acting in pairs perform an action of approaching and moving away from each other once, and repeat this action a plurality of times, to form, through stacking, a neat workpiece queue 11 including a plurality of workpieces 1. When the action is repeated for stacking, relative movement occurs between the shapers 4 and the stacking table 2 along the second direction. The relative movement may be implemented through movement of either or both of the rack 3 and the stacking table 2 along the second direction. Specific structures of the rack 3 and the stacking table 2 are described in detail below.

In addition, a distance between paired shapers 4 approaching each other may be adjusted based on sizes of different workpieces 1 (sizes along the first direction) and a size of a workpiece queue 11 to be formed stacking (a size along the first direction). In a manner of adjustment, for example, a stroke by which shapers 4 acting in pairs approach or move away from each other may be adjusted based on a size (a size along the first direction) of a to-be-stacked workpiece, or an occasion or a position at which shapers 4 acting in pairs switch from an approaching action to an action of moving away from each other may be controlled based on a ranging result of a rangefinder that performs ranging between the shapers 4, or based on a sensing result of a contact sensor, a pressure sensor, or the like that senses contact between the shapers 4 and side surfaces of the workpiece 1.

In addition, in some embodiments, two or more pairs of shapers 4 may be arranged to respectively perform stacking operations on workpieces 1. In the embodiments shown in FIG. 1 to FIG. 5, an example in which two pairs of shapers 4 are arranged is shown.

The stacking apparatus 100 is provided with shapers 4 that act in pairs, and these shapers 4 perform an alignment operation through an action of approaching each other along the first direction. Therefore, workpieces 1 can be aligned by using a simple structure and a simple action to form a neat workpiece queue 11. In this way, a plurality of workpieces 1 can be quickly aligned in a simple and automated manner, so that labor costs are reduced, and stacking efficiency is improved.

In addition, because alignment and stacking are implemented through approaching between paired shapers 4, a distance (or a range of an action) between two shapers 4 approaching each other can be adjusted to adapt to workpieces 1 with different sizes and specifications, for example, to be compatible with stacking of a single row of workpieces 1 and stacking of double rows of workpieces 1. This achieves good compatibility and facilitates flexible production. Moreover, because shapers 4 act in pairs, a throughput of the stacking apparatus can be increased by arranging more than one pair of shapers 4 (for example, two pairs of shapers 4), to improve production efficiency at the work station.

In some embodiments of this disclosure, the stacking apparatus 100 further includes a push plate 5 and a reference plate 6. The push plate 5 is configured to perform a pushing operation on the workpiece 1. The push plate 5 is arranged on the base bracket 10 and is configured to be able to move forward or backward along the second direction that intersects with the first direction, and the pushing operation is performed through the forward movement action of the push plate 5. The reference plate 6 is arranged on the base bracket 10 and arranged on an opposite side of the push plate 5 along the second direction, and is configured to block the workpiece 1.

The stacking apparatus 100 may further make the workpiece queue 11 compact and neater along the second direction. To be specific, after the alignment operation is performed along the first direction, the pushing operation may be further performed on the workpiece 1 by using the push plate 5. Through the pushing operation, a gap between workpieces 1 along the second direction can be reduced or even eliminated.

In the embodiments of this disclosure, the push plate 5 is connected to the rack 3, and is indirectly arranged on the base bracket 10 through the rack 3. The rack 3 may be configured to be able to move forward or backward along the second direction to implement forward or backward movement of the push plate 5. Certainly, in some other embodiments, the push plate 5 may alternatively be directly arranged on the base bracket 10, and the push plate 5 may be configured to be able to move forward or backward relative to the rack 3 along the second direction, to implement forward or backward movement of the push plate 5. The push plate 5 may include a pushing surface 5*a* for pushing the workpiece 1. A shape of the push plate 5 may be a plate shape that is long along the first direction, or may be a strip shape, a rod shape, or the like that is long along the first direction. The shape of the push plate 5 is not particularly limited, provided that the push plate 5 can push the workpiece 1. A length of the push plate 5 only needs to enable the push plate 5 to push workpieces 1 with all sizes that the stacking apparatus 100 is compatible with.

As shown in FIG. 2, the reference plate 6 is arranged on an end side of the base bracket 10 along the second direction. The reference plate 6 is supported by a bracket (not shown) or the like, and the bracket (not shown) is fastened to the base bracket 10. The reference plate 6 may be fastened to a position slightly above a placement surface of the stacking table 2, to block a workpiece placed on the stacking table 2. The reference plate 6 may alternatively be configured to be movable along the third direction, so that the reference plate 6 can move to a position slightly above the placement surface of the stacking table 2 according to a requirement. When the reference plate 6 needs to act to perform a blocking function, the reference plate 6 is located at a lower blocking position. When the reference plate 6 does not need to act, the reference plate 6 may further ascend to a third position. When the reference plate 6 ascends to the third position, a channel for conveying the workpiece 1, the workpiece queue 11, or an empty tray 8 can be formed below the reference plate 6. In addition, optionally, the reference plate 6 may alternatively move horizontally along the second direction, so that a starting position of a to-be-stacked workpiece queue 11 can be adjusted based on a specific condition such as a length of the workpiece queue 11. Movement of the reference plate 6 along the second direction and movement of the reference plate 6 along the third direction may be implemented by an action cylinder.

The reference plate 6 is arranged in such a way that a reference plane faces the rack 3, and the reference plane includes a flat surface. The reference plate 6 may alternatively be provided with a buffer layer on the reference plane side, to avoid noise, deformation or damage of the workpiece 1, and other adverse conditions caused by collision between the rigid reference plate 6 and the workpiece 1. A length of the reference plate 6 only needs to enable the reference plate 6 to block workpieces 1 with all sizes that the stacking apparatus 100 is compatible with. For example, the length of the reference plate 6 may be set to be the same or basically the same as a length dimension of the push plate 5.

In this way, workpieces 1 can be aligned along the first direction, and the workpieces 1 properly aligned along the first direction can also be aligned along the second direction, so that the workpieces are stacked into a neat and compact workpiece queue along both the first direction and the second direction. Because adjacent workpieces in the workpiece queue along the second direction can abut against each other as close as possible, a length of the workpiece queue can be reduced, and a risk that the workpiece queue is scattered again in a subsequent processing procedure can be reduced. This also facilitates miniaturization and integration of a final product. Moreover, because the pushing operation is performed through the forward movement action of the push plate 5, the push plate 5 can easily implement the pushing operation even for workpieces with different sizes and specifications. In addition, because the reference plate 6 is further arranged, a starting position of the workpiece queue can be limited, to prevent the workpieces 1 from being excessively pushed. Moreover, the workpieces can be aligned from both sides along the second direction through cooperation between the reference plate 6 and the push plate 5.

In some embodiments of this disclosure, the push plate 5 is configured to be able to ascend and descend between a first position and a second position at which the pushing operation is performed, and when the push plate 5 ascends to the first position, a channel 45 (as shown in FIG. 1 and FIG. 3) is formed below the push plate 5.

The “first position” in the embodiments of this disclosure is a backoff position of the push plate 5. To be specific, when the push plate 5 is at the first position, the push plate 5 does not interfere with the workpiece 1 or the workpiece queue 11, and the channel 45 for conveying the workpiece 1, the workpiece queue 11, or the empty tray 8 is formed below the push plate 5. The “second position” is a pushing position of the push plate 5. To be specific, when the push plate 5 is at the second position, the push plate 5 is approximately flush with a height of the workpiece queue 11 along the third direction, so that the push plate 5 can perform a pushing operation on the workpiece queue 11.

The empty tray 8 or a stacked workpiece queue 11 may be transported to another place through the channel 45. To form a smooth and accessible channel, the push plate 5 may be enabled to ascend to the first position, and all shapers 4 are enabled to move to a farthest side along the first direction (for example, refer to a state of a push plate and shapers on a rack 3 on the right in FIG. 3). An ascending or descending action of the push plate 5 may be implemented by an action cylinder or the like. The ascending or descending action of the push plate 5 may be performed after the shapers 4 finishes stacking of the entire workpiece queue 11, or may be performed each time a pushing operation is performed.

In this way, the push plate 5 can descend from the first position to the second position when the pushing operation needs to be performed, to complete the pushing operation on the workpiece 1. In addition, the push plate 5 can ascend from the second position to the first position after the pushing operation is completed, to form the channel 45 below the push plate 5, so that the stacked workpiece queue 11 can flow out of the stacking apparatus 100 from the channel 45 without passing through a manipulator or the like. This simplifies a production line device, reduces control steps, and further helps improve production efficiency. Certainly, the empty tray 8 may alternatively be designed to pass through the channel 45 and be placed on the stacking table 2.

In some embodiments, when the reference plate 6 is at the third position, a channel for conveying the workpiece 1, the workpiece queue 11, or the empty tray 8 may also be formed below the reference plate 6.

In this way, in addition to the foregoing case in which the empty tray 8 and the stacked workpiece queue 11 can flow in or out through the channel 45 below the push plate 5, the empty tray 8 can further enter the stacking table 2 through the channel 45 below the push plate 5, and the stacked workpiece queue 11 can be transported to another place through the channel below the reference plate 6. Certainly, the empty tray 8 may alternatively enter the stacking table 2 through the channel below the reference plate 6, and the stacked workpiece queue 11 flows out through the channel 45 below the push plate 5. Certainly, a conveying direction of a conveying system (described in detail below) for the tray 8 needs to be adjusted correspondingly.

In this way, the reference plate 6 can descend from the third position to the blocking position when a blocking operation needs to be performed, to block the workpiece 1. In addition, after the stacking apparatus 100 completes alignment and stacking operations on the workpiece 1, the reference plate 6 ascends from the blocking position to the third position, to form a channel below the reference plate 6, so that the stacked workpiece queue 11 flows out of the stacking apparatus 100 through the channel without passing through a manipulator or the like. This also simplifies a production device and helps improve production efficiency.

In some embodiments of this disclosure, the at least two shapers 4 are sequentially arranged along the first direction, any two adjacent shapers are configured to be able to approach or move away from each other along the first direction, and an alignment operation is performed through an approaching action.

Two adjacent shapers 4 can approach or move away from each other along the first direction to align or stack workpieces 1 located between the two shapers 4. In this way, an operation of aligning workpieces 1 to form a neat workpiece queue 11 is implemented by using a simple structure and a simple action, and a plurality of workpieces 1 can be quickly aligned in a simple and automated manner. This reduces labor costs and improves stacking efficiency.

In some embodiments of this disclosure, the shapers 4 include a first shaper 41, a second shaper 42, and a third shaper 43 that are sequentially arranged along the first direction. The first shaper 41 and the second shaper 42 are configured to be able to approach or move away from each other along the first direction. The second shaper 42 and the third shaper 43 are configured to be able to approach or move away from each other along the first direction.

The first shaper 41 and the second shaper 42 can approach or move away from each other along the first direction to align and stack workpieces 1 located between the first shaper 41 and the second shaper 42. The second shaper 42 and the third shaper 43 can approach or move away from each other along the first direction to align and stack workpieces 1 located between the second shaper 42 and the third shaper 43. In this way, two groups of workpieces 1 can be simultaneously aligned and stacked in an automated manner, so that stacking efficiency is effectively improved. In addition, a structure and an action are simple, so that production costs are effectively reduced.

For example, the first shaper 41 and the third shaper 43 may always be located at limiting positions farthest from each other along the first direction, and the second shaper 42 can move along the first direction and is initially located at a middle position between the first shaper 41 and the third shaper 43 along the first direction. The two groups of workpieces 1 are respectively located between the first shaper 41 and the second shaper 42 and between the second shaper 42 and the third shaper. During an alignment operation on the two groups of workpieces 1, first, the second shaper 42 approaches the first shaper 41 along the first direction, in other words, moves away from the third shaper 43 along the first direction, to align and stack workpieces 1 between the first shaper 41 and the second shaper 42; and then the second shaper 42 approaches the third shaper 43 along the first direction, in other words, moves away from the first shaper 41 along the first direction, to align and stack workpieces 1 between the second shaper 42 and the third shaper 43. In this way, the two groups of workpieces 1 are aligned. Certainly, in some other embodiments, the second shaper 42 may alternatively first approach the third shaper 43 and then approach the first shaper 41, to align and stack the two groups of workpieces 1.

For another example, the first shaper 41, the second shaper 42, and the third shaper 43 can all move along the first direction, the first shaper 41 and the third shaper 43 are initially located at limiting positions farthest away from each other along the first direction, and the second shaper 42 is initially located at a middle position between the first shaper 41 and the third shaper 43 along the first direction. The two groups of workpieces 1 are respectively located between the first shaper 41 and the second shaper 42 and between the second shaper 42 and the third shaper. During an alignment operation on the two groups of workpieces 1, first, the first shaper 41 and the second shaper 42 approach each other along the first direction, to align and stack workpieces 1 between the first shaper 41 and the second shaper 42; and then the second shaper 42 and the third shaper 43 approach each other along the first direction, to align and stack workpieces 1 between the second shaper 42 and the third shaper 43. In this way, the two groups of workpieces 1 are aligned. Certainly, in some other embodiments, the second shaper 42 and the third shaper 43 may alternatively first approach each other, and then the first shaper 41 and the second shaper 42 approach each other, to align and stack the two groups of workpieces 1.

In some embodiments of this disclosure, as shown in FIG. 1 to FIG. 5, the shaper 4 includes a first shaper 41, a second shaper 42, a third shaper 43, and a fourth shaper 44 that are sequentially arranged along the first direction. The first shaper 41 and the second shaper 42 are configured to be able to approach or move away from each other along the first direction. The third shaper 43 and the fourth shaper 44 are configured to be able to approach or move away from each other along the first direction. The second shaper 42 and the third shaper 43 are configured to be able to approach or move away from each other along the first direction. An alignment operation is performed through an approaching action.

The first shaper 41 and the second shaper 42 can approach or move away from each other along the first direction to align and stack workpieces 1 located between the first shaper 41 and the second shaper 42. The third shaper 43 and the fourth shaper 44 can approach or move away from each other along the first direction to align and stack workpieces 1 located between the third shaper 43 and the fourth shaper 44. In this way, the four shapers can perform alignment actions in two groups to simultaneously form two neat workpiece queues 11 through stacking.

In addition, because the four shapers are arranged, two shapers located in the middle, namely, the second shaper 42 and the third shaper 43, may alternatively be paired to perform an action of approaching or moving away from each other. When the first shaper 41 and the fourth shaper 44 are located at limiting positions farthest away from each other along the first direction, a distance between the second shaper 42 and the third shaper 43 located at closest positions is greater than a distance between the first shaper 41 and the second shaper 42 located at closest positions and a distance between the third shaper 43 and the fourth shaper 44 located at closest positions. Therefore, an alignment operation may be performed on workpieces 1 through an approaching action between the second shaper 42 and the third shaper 43, to form neat workpiece queue 11 through stacking. In addition, a size range, along the first direction, of workpieces 1 that can be stacked is larger.

A plurality of shapers 4 can simultaneously align and stack a plurality of groups of workpieces 1. This helps improve stacking efficiency of the stacking apparatus. In addition, because a plurality of shapers 4 can act in pairs in different combinations, the stacking apparatus is compatible with stacking of workpieces 1 with different sizes and specifications such as a single row of workpieces and double rows of workpieces, and switching between different stacking modes can be implemented without accessory replacement. This improves compatibility of the stacking apparatus and improves stacking efficiency.

In some embodiments of this disclosure, the stacking apparatus 100 further includes a controller (not shown in the figures). The controller performs control so that the stacking apparatus 100 performs an alignment operation in one of a first alignment mode and a second alignment mode and is able to switch between the first alignment mode and the second alignment mode. In the first alignment mode, the first shaper 41 and the second shaper 42 perform an alignment operation, and/or the third shaper 43 and the fourth shaper 44 perform an alignment operation. In the second alignment mode, the second shaper 42 and the third shaper 43 perform an alignment operation, and the first shaper 41 and the fourth shaper 44 are in a standby state.

As described above, the four shapers may act in pairs in two modes. In one mode, the first shaper 41 and the second shaper 42 act in pairs, and the third shaper 43 and the fourth shaper 44 act in pairs. In the other mode, the second shaper 42 and the third shaper 43 act in pairs, and the first shaper 41 and the fourth shaper 44 are located at limiting positions farthest away from each other along the first direction. Therefore, the two paired action modes are respectively used as two alignment modes: the first alignment mode and the second alignment mode. Herein, it should be noted that the first shaper 41 and the fourth shaper 44 being in a standby state means that the first shaper 41 and the fourth shaper 44 stay at limiting positions farthest away from each other along the first direction.

A stacking apparatus 100 may choose whether to perform alignment and stacking in the first alignment mode or perform alignment and stacking in the second alignment mode based on a size of a to-be-stacked workpiece 1. In addition, the stacking apparatus 100 may further switch between the first alignment mode and the second alignment mode based on a change in the size of the to-be-stacked workpiece 1. It should be noted that the change in the size of the workpiece 1 includes a change in a size of a single workpiece along the first direction, and a change in a size of the to-be-stacked workpiece 1 along the first direction caused by combining individual workpieces into a workpiece unit.

A battery stacking scenario is used as an example for further description. For example, if the to-be-stacked workpiece 1 (a workpiece 1 located between shapers acting in pairs when the shapers perform an alignment action) is the battery shown in (a) of FIG. 11 or the battery unit shown in (b) of FIG. 11, two battery queues may be simultaneously formed through stacking in the first alignment mode. If each battery queue is referred to as a single-row module, two single-row modules may be simultaneously formed through stacking in the first alignment mode.

For another example, if the to-be-stacked workpiece 1 (a workpiece 1 located between shapers acting in pairs when the shapers perform an alignment action) is the battery unit shown in (c) or (d) of FIG. 11, one battery unit queue may be formed through stacking in the second alignment mode. If the battery unit queue is referred to as a double-row module, one double-row module may be formed through stacking in the second alignment mode.

Persons skilled in the art should know that the description of the battery stacking scenario herein is only an example, and the battery stacking scenario is not limited to the foregoing stacking mode. For example, during stacking in the first alignment mode, the workpiece 1 may alternatively be a battery unit obtained by combining two or more batteries along the first direction. In addition, during stacking in the second alignment mode, the workpiece 1 may alternatively be a battery unit obtained by combining three or more batteries along the first direction.

In addition, the controller may be implemented by using a microcomputer, a programmable controller, or the like. Certainly, the controller may alternatively be implemented in other known manners. The controller is not particularly in the embodiments of this disclosure, provided that functions of the controller can be implemented.

The stacking apparatus 100 has two different alignment modes, so that the stacking apparatus 100 is compatible with stacking of workpieces with different sizes and specifications such as a single row of workpieces and double rows of workpieces, and higher compatibility is achieved. The first shaper 41 and the second shaper 42 perform an alignment operation, and the third shaper 43 and the fourth shaper 44 perform an alignment operation. In this way, the two pairs of shapers 4 can act in parallel, so that stacking efficiency can be improved. In addition, the second shaper 42 and the third shaper 43 can alternatively perform an alignment operation, to implement compatibility with stacking of workpieces 1 with different sizes and specifications from those of workpieces 1 in the first alignment mode. Moreover, the first shaper 41 and the fourth shaper 44 that are located on two sides are at standby positions. Therefore, large action space can be provided for the second shaper 42 and the third shaper 43, so that double rows of workpieces or workpieces with larger sizes can be stacked, and the first shaper 41 and the fourth shaper 44 do not interfere with the second shaper 42 and the third shaper 43. In addition, the stacking apparatus 100 can automatically switch between the two alignment modes through the controller, and compatibility with workpieces with different sizes and specifications can be implemented simply by changing an action combination of the four shapers. Switching is simple, and continuous alignment and stacking operations can be implemented for workpieces with different sizes and shapes, so that an automation degree of the stacking apparatus and production efficiency are higher.

The following further describes in detail specific structures of the rack 3 and components arranged on the rack 3 with reference to the accompanying drawings.

For example, as shown in FIG. 4 and FIG. 5, the rack 3 includes three transverse frames extending along the first direction and two longitudinal frames extending along the third direction. The longitudinal frames are respectively connected to two ends of the three transverse frames. The three transverse frames each are provided with a rack-side sliding rail 38. A first screw rod 31 and a second screw rod 32 that extend along the first direction are separately arranged between the two longitudinal frames. For example, the first screw rod 31 and the second screw rod 32 are arranged in parallel at a spacing along the third direction. The first screw rod 31 and the second screw rod 32 are respectively connected to output ends of a first driving apparatus 33 and a second driving apparatus 34. The push plate 5 is mounted on the rack 3, for example, fastened to a transverse frame of the rack 3.

A lower part of each of the two longitudinal frames is connected to a moving portion support 37. A moving portion 36 is arranged on the moving portion support 37. A third driving apparatus 35 is further mounted on the moving portion support 37, and the moving portion 36 is connected to an output end of the third driving apparatus 35. The moving portion 36 includes a meshing member 361. The meshing member 361 may be mounted on either or both of two moving portion supports 37 of the rack 3. For example, in the embodiments shown in FIG. 4 and FIG. 5, a meshing member 361 is mounted on one moving portion support 37. The meshing member 361 is meshed with a moving track 13 on a side of the base bracket 10, and can move on the moving track 13 under driving by the third driving apparatus 35. For example, the meshing member 361 may be a gear, and the moving track 13 may be a gear rack. In a specific example, the meshing member 361 is a helical gear. For another example, the meshing member 361 may be a nut meshed with a screw rod, and the moving track 13 may be the screw rod.

The moving portion 36 may further include a rack-side slider. For example, a rack-side slider is mounted below each of the two moving portion supports 37, and a rack-side slider mounted on the same moving portion support 37 as the meshing member 361 is referred to as a rack-side first slider 362. There may be one, two, or more rack-side first sliders 362. In the embodiment shown in FIG. 5, a total of four rack-side first sliders 362 are arranged around the meshing member 361. A rack-side slider mounted on the other moving portion support 37 is referred to as a rack-side second slider 363. There may be one, two, or more rack-side second sliders 363. A distribution position of the rack-side second slider 363 may be the same as or different from that of the rack-side first slider 362.

In the embodiment shown in FIG. 5, two racks 3 are arranged side by side, and moving portion supports 37 of the two racks 3 share one second base bracket 102. Therefore, a size of one moving portion support 37 sharing the second base bracket 102 along the first direction is designed to be less than a size of the other moving portion support 37 along the first direction. The smaller moving portion support 37 is provided with two rack-side second sliders 363, and the two rack-side second sliders 363 are arranged along the second direction. Certainly, one rack-side second slider 363 may alternatively be arranged to replace the two rack-side second sliders 363. In addition, when two racks 3 are arranged side by side, the meshing member 361 and the rack-side first slider 362 are arranged on moving portion supports 37, farthest away from each other, of the two racks 3 arranged side by side. To be specific, the two racks 3 are symmetrically arranged with respect to an axis of symmetry between the two racks 3 along the third direction.

The shaper 4 arranged on the rack 3 includes a shaping plate 46 with a shaping surface **4*a*, and a screw rod connecting plate 49 connected to the first screw rod 31 or the second screw rod 32. The shaping plate 46 and the screw rod connecting plate 49 may be connected together through a moving plate 48. The moving plate 48 is, for example, a strip-shaped plate. The moving plate 48 is mounted on, for example, a side of the rack 3 on which the rack-side sliding rail 38 is arranged. The shaping plate 46 is connected to one end of the moving plate 48, and the shaping surface 4*a* of the shaping plate 46 is made to extend along a plane perpendicular to the first direction. The shaping plate 46 may be connected to one end of the moving plate 48 through an approximately right-angled connecting bracket 47**.

A shaper-side slider 50, for example, three shaper-side sliders 50, may alternatively be arranged on a surface, facing the rack-side sliding rail 38, of the moving plate 48. The shaper-side sliders 50 can respectively slide along rack-side sliding rails 38 through fitting with the rack-side sliding rails 38. A quantity of shaper-side sliders 50 and a quantity of rack-side sliding rails 38 are not limited to 3, but may be 1 or 2 or greater than 3.

One end of the screw rod connecting plate 49 is mounted on the moving plate 48, and the other end is connected to the first screw rod 31 or the second screw rod 32. For example, the screw rod connecting plate 49 is arranged on the moving plate 48 in a posture of being approximately perpendicular to the moving plate 48. For example, the screw rod connecting plate 49 is fastened to an outer peripheral surface of a nut that can move on the first screw rod 31 or the second screw rod 32, so that the screw rod connecting plate 49 can be driven by the nut to move along the first screw rod 31 or the second screw rod 32.

In some embodiments, four shapers are arranged, and structures of the four shapers may be basically the same, except that a connection position for the screw rod connecting plate 49 on the moving plate 48 varies based on whether the screw rod connecting plate 49 is connected to the first screw rod 31 or the second screw rod 32. For example, the first screw rod 31 is arranged at a position lower than the second screw rod 32. Therefore, screw rod connecting plates 49 of two shapers 4 (the first shaper 41 and the fourth shaper 44) connected to the first screw rod 31 are arranged at positions approximately in the middle of the moving plate 48 along the third direction, and screw rod connecting plates 49 of two shapers 4 (the second shaper 42 and the third shaper 43) connected to the second screw rod 32 are arranged at positions close to an upper end of the moving plate 48 along the third direction.

In the embodiments shown in FIG. 1 to FIG. 5, the shaping plate 46 is approximately in a quadrangular prism shape, and the shaping surface 4*a* is a rectangular plane. However, a shape of the shaping plate 46 is not limited thereto, and may alternatively be other shapes, for example, a strip shape or a rod shape extending along the second direction. In addition, a surface of the shaping plate 46 along the first direction is not limited to a flat surface, and may alternatively have a step, where a step surface of the step along the first direction may function as a shaping surface.

Persons skilled in the art should understand that the foregoing composition of the shaper 4 is only an example, and the composition of the shaper 4 may alternatively be changed, provided that a corresponding function can be implemented.

In some embodiments of this disclosure, as shown in FIG. 4, the first shaper 41 and the fourth shaper 44 are connected to the first screw rod 31, the first driving apparatus 33 is connected to the first screw rod 31, and the first shaper 41 and the fourth shaper 44 are driven by the first driving apparatus 33 to move toward each other or move away from each other along the first screw rod 31. The second shaper 42 and the third shaper 43 are connected to the second screw rod 32, the second driving apparatus 34 is connected to the second screw rod 32, and the second shaper 42 and the third shaper 43 are driven by the second driving apparatus 34 to move away from each other or move toward each other along the second screw rod 32. In the first alignment mode, the first shaper 41 and the fourth shaper 44 are enabled to move toward each other, and the second shaper 42 and the third shaper 43 are enabled to move away from each other, so that the first shaper 41 and the second shaper 42 approach each other and the third shaper 43 and the fourth shaper 44 approach each other, to perform an alignment operation in the first alignment mode. In the second alignment mode, the first shaper 41 and the fourth shaper 44 are enabled to be in a standby state, and the second shaper 42 and the third shaper 43 are enabled to move toward each other, to perform an alignment operation in the second alignment mode.

Refer to FIG. 5 and FIG. 6. Screw rod connecting plates 49 of the first shaper 41 and the fourth shaper 44 are respectively connected to two nuts (not shown in the figures) that can move on the first screw rod 31 along the first direction toward an opposite direction along with rotation of the first screw rod 31. Screw rod connecting plates 49 of the second shaper 42 and the third shaper 43 are respectively connected to two nuts (not shown in the figures) that can move on the second screw rod 32 along the first direction toward an opposite direction along with rotation of the second screw rod 32. For example, the first screw rod 31 and the second screw rod 32 each may be implemented by using a bidirectional screw rod (a screw rod with two types of threads facing opposite directions).

In the first alignment mode, first, the four shapers are enabled to be at ready positions. To be specific, the first shaper 41 and the fourth shaper 44 are at positions farthest away from each other, as shown in FIG. 5; and the second shaper 42 and the third shaper 43 are at positions closest to each other, as shown in FIG. 5. When the first driving apparatus 33 and the second driving apparatus 34 are driven to drive the first screw rod 31 and the second screw rod 32 to rotate, a rotation direction of the first screw rod 31 enables the two nuts connected to the first shaper 41 and the fourth shaper 44 to move toward each other, and a rotation direction of the second screw rod 32 enables the two nuts connected to the second shaper 42 and the third shaper 43 to move away from each other. In this way, the first shaper 41 and the second shaper 42 move relative to each other toward a direction to approach each other, and the third shaper 43 and the fourth shaper 44 also move relative to each other toward a direction to approach each other. When the rotation directions of both the first screw rod 31 and the second screw rod 32 are changed by the first driving apparatus 33 and the second driving apparatus 34, the four shapers perform reverse actions. To be specific, the first shaper 41 and the second shaper 42 move relative to each other toward a direction to be away from each other, and the third shaper 43 and the fourth shaper 44 also move relative to each other toward a direction to be away from each other. The first driving apparatus 33 and the second driving apparatus 34 repeatedly perform forward-rotation driving and reverse-rotation driving, so that the first shaper 41 and the second shaper 42, and the third shaper 43 and the fourth shaper 44 repeatedly perform an alignment operation and then move away from each other, and then perform an alignment operation again and then move away from each other again.

Moreover, a moving speed and/or a moving stroke of the nuts on the first screw rod 31 and a moving speed and/or a moving stroke of the nuts on the second screw rod 32 can be set to enable all of the four shapers to reciprocate at specified stroke positions. In this way, shapers 4 acting in pairs can move to the same positions each time an alignment operation is performed, and a middle position (a center line position) between paired shapers 4 along the first direction remains unchanged. When a size of a to-be-stacked workpiece 1 along the first direction changes, ready positions and/or stroke positions of the shapers 4 may be adjusted to adapt to the changed workpiece 1.

In the second alignment mode, first, the four shapers are enabled to be at ready positions. To be specific, the first shaper 41 and the fourth shaper 44 are at positions farthest away from each other, as shown in FIG. 5; and the second shaper 42 and the third shaper 43 are at positions away from each other, as shown in FIG. 2. When the first driving apparatus 33 does not act and the second driving apparatus 34 drives the second screw rod 32 to rotate, the first screw rod 31 does not rotate, and the two nuts on the first screw rod 31 do not move. Therefore, the first shaper 41 and the fourth shaper 44 that are connected to the nuts stay at the positions farthest away from each other (also referred to as standby positions). In addition, a rotation direction of the second screw rod 32 enables the two nuts connected to the second shaper 42 and the third shaper 43 to move toward each other. In this way, the second shaper 42 and the third shaper 43 move relative to each other toward a direction to approach each other. When the first driving apparatus 33 does not act and the second driving apparatus 34 changes the rotation direction of the second screw rod 32, the second shaper 42 and the third shaper 43 move relative to each other toward a direction to be away from each other. The second driving apparatus 34 repeatedly performs forward-rotation driving and reverse-rotation driving, so that the second shaper 42 and the third shaper 43 repeatedly perform an alignment operation and then move away from each other, and then perform an alignment operation again and then move away from each other again.

Moreover, a moving speed and/or a moving stroke of the nuts on the second screw rod 32 can be set to enable the second shaper 42 and the third shaper 43 to always reciprocate at specified stroke positions. In this way, the second shaper 42 and the third shaper 43 can move to the same positions each time an alignment operation is performed, and a middle position (a center line position) between the second shaper 42 and the third shaper 43 along the first direction remains unchanged. When a size of a to-be-stacked workpiece 1 along the first direction changes, ready positions and/or stroke positions of the second shaper 42 and the third shaper 43 may be adjusted to adapt to the changed workpiece 1.

For example, the first driving apparatus 33 and the second driving apparatus 34 include but are not limited to motors. In a specific example, a servo motor may be used.

Certainly, persons skilled in the art should understand that implementations of actions of performing alignment by the first shaper 41, the second shaper 42, the third shaper 43, and the fourth shaper 44 in the first alignment mode and performing alignment in the second alignment mode are not limited to the foregoing kinematic pair form with a bidirectional screw rod and a nut, and other transmission mechanisms may alternatively be used provided that alignment in the first alignment mode, alignment in the second alignment mode, and switching between the two alignment modes can be implemented. For example, transmission through a gear and a gear rack, a chain transmission assembly, or belt transmission may alternatively be used. Alternatively, the first shaper 41, the second shaper 42, the third shaper 43, and the fourth shaper 44 each may be provided with a drive motor for implementation.

In this way, the two screw rods are driven so that shapers 4 arranged on each screw rod move relative to each other, to implement a state in which the first shaper 41 and the second shaper 42 perform an action of approaching each other and the third shaper 43 and the fourth shaper 44 perform an action of approaching each other. Therefore, alignment can be easily implemented for a workpiece 1 between the first shaper 41 and the second shaper 42 and for a workpiece 1 between the third shaper 43 and the fourth shaper 44 (for example, a center line of the workpiece is aligned with a center line between the shapers acting in pairs), without an additional alignment reference. Therefore, reliable alignment in the first alignment mode can be implemented by using a simple structure in an automated manner.

In addition, the second shaper 42 and the third shaper 43 arranged on one screw rod are enabled to move close to each other along the screw rod, and the first shaper 41 and the fourth shaper 44 arranged on the other screw rod are enabled to be in a standby state, so that alignment can be easily implemented for a workpiece between the second shaper 42 and the third shaper 43 (for example, a center line of the workpiece is aligned with a center line between the shapers acting in pairs), without an additional alignment reference. Therefore, reliable alignment in the second alignment mode can be implemented by using a simple structure in an automated manner. In this way, a flexible pairing action of the four shapers is implemented through the two screw rods, with a simple structure and a smart design. In addition, transmission by the screw rods has high transmission efficiency and low energy consumption. This better facilitates energy saving and environmental protection.

In some embodiments of this disclosure, each shaper 4 has a shaping surface **4*a* facing an adjacent shaper 4, and the shaping surface 4*a* is used for contact with the workpiece 1**.

Each shaper 4 has a shaping surface **4*a* on a side facing an adjacent shaper 4, so that a condition for flexible pairing of shapers 4 is met. In the embodiments shown in FIG. 4 and FIG. 5, there are four shapers: the first shaper 41, the second shaper 42, the third shaper 43, and the fourth shaper 44. The first shaper 41 has a shaping surface 4*a* on a side facing the second shaper 42. The fourth shaper 44 has a shaping surface 4*a* on a side facing the third shaper 43. The second shaper 42 and the third shaper 43 respectively have shaping surfaces 4*a* on two sides along the first direction. In this way, regardless of the first alignment mode or the second alignment mode, the shaping surface 4*a* of the shaper 4 can be in contact with a surface of a to-be-stacked workpiece 1**.

Shapes of the shaping surfaces **4*a* of the shapers 4** may be the same or different.

Shapes of shaping surfaces **4*a* of one shaper 4 that face different adjacent shapers 4 may be the same or different. For example, a shape of a shaping surface 4*a* of the second shaper 42 that faces the first shaper 41 may be the same as or different from a shape of a shaping surface 4*a* of the second shaper 42 that faces the third shaper 43**.

In this way, good alignment can be implemented simply through contact between the shaping surface **4*a* and the workpiece. A structure is simple, and alignment effect is good. In addition, because the second shaper 42 has a shaping surface facing the first shaper 41 and a shaping surface facing the third shaper 43 and the third shaper 43 has a shaping surface 4*a* facing the second shaper 42 and a shaping surface 4*a* facing the fourth shaper 44, the second shaper 42 and the third shaper 43 can align workpieces through contact between the shaping surfaces 4*a* and workpieces in both the first alignment mode and the second alignment mode, to obtain a neat workpiece queue 11** through stacking.

In some embodiments of this disclosure, the stacking apparatus 100 further includes the rack 3, and the rack 3 is arranged on the base bracket 10 in a manner of being movable relative to the base bracket 10, and is configured to be able to move forward or backward along the second direction above the stacking table 2 under driving by the third driving apparatus 35. The shapers 4 and the push plate 5 are all connected to the rack 3, and move forward or backward along the second direction together with the rack 3.

The push plate 5 and a connection structure between the push plate 5 and the rack 3 are further described with reference to FIG. 4, FIG. 5, FIG. 7, and FIG. 8. In the embodiments shown in FIG. 4, FIG. 5, FIG. 7, and FIG. 8, the push plate 5 is, for example, a strip-shaped flat plate with a pushing surface 5*a* facing a side of the reference plate 6. Persons skilled in the art should understand that a shape of the push plate 5 is not limited thereto.

The push plate 5 is mounted on the rack 3, for example, through a push plate mounting plate 52. In a specific example, the push plate mounting plate 52 is connected to a transverse frame of the rack 3 from a side of the transverse frame on which no rack-side sliding rail 38 is arranged, and the pushing surface 5*a* of the push plate 5 is located at a position below the transverse frame of the rack 3. As shown in FIG. 7 and FIG. 8, the push plate 5 may be connected to the push plate mounting plate 52 through a push plate bracket 51. Specifically, the push plate bracket 51 includes a first bracket part 511 that stands upright when mounted on the rack 3, a second bracket part 512 that is connected to a lower end of the first bracket part 511 and that protrudes along the second direction, and a third bracket part 513 that is connected to an upper end of the first bracket part 511. The push plate mounting plate 52 is mounted on the first bracket part 511, and the push plate 5 is mounted at an end of the second bracket part 512.

A lifting guide rail 40 extending along the third direction is mounted on a surface, facing a side on which the third bracket part 513 is located, of the push plate mounting plate 52. A push plate-side slider 514 is mounted on a surface, facing the push plate mounting plate 52, of the third bracket part 513. The push plate-side slider 514 can slide along the lifting guide rail 40 through fitting between a sliding groove on the push plate-side slider 514 and the lifting guide rail 40. The third bracket part 513 of the push plate bracket 51 is connected to a cylinder rod of a lifting cylinder 39, to ascend or descend along with extension or retraction of the cylinder rod. A cylinder body of the lifting cylinder 39 is fastened to the push plate mounting plate 52. In this way, the push plate bracket 51 can be pushed or pulled by the lifting cylinder 39 to ascend or descend along the lifting guide rail 40, to drive the push plate 5 to ascend or descend. The lifting cylinder 39 may be controlled by the controller or the like.

In addition, as shown in FIG. 4, a moving portion 36 is arranged in a lower part of the rack 3, and the moving portion 36 may fit with a base-side sliding rail 12 and the moving track 13 on a side of the base bracket 10. Specifically, a meshing member 361 in the moving portion 36 may be meshed with the moving track 13 on the side of the base bracket 10, and can move on the moving track 13 under driving by the third driving apparatus 35. For example, the meshing member 361 may be a gear, the moving track 13 may be a gear rack, and the gear may rotate forward or reversely. In this way, meshing of the meshing member 361 along the moving track 13 can drive the entire rack 3, together with the shapers 4, the push plate 5, and the like arranged on the rack 3, to move forward or backward along the second direction.

In addition, a rack-side first slider 362 and a rack-side second slider 363 in the moving portion 36 may fit with the base-side sliding rail 12 arranged on the base bracket 10 to move on the base-side sliding rail 12.

The third driving apparatus 35 includes but is not limited to a motor. In a specific example, a servo motor may be used.

In addition, as shown in FIG. 2, a bracket 30 is further arranged in a lower part of the rack 3. The bracket 30 is arranged near a moving end of a drag chain 14, and is configured to support a harness (not shown in the figure) and the like.

The entire rack 3, together with the shapers 4, the push plate 5, and the like arranged on the rack 3, can move forward or backward along the second direction. Therefore, the rack 3 may be enabled to move near a position at which a to-be-stacked workpiece 1 is placed, so that the to-be-stacked workpiece 1 is located between two shaping surfaces 4*a* of shapers 4 that need to act in pairs, and an alignment operation can be accurately performed by using the shapers 4. After one alignment operation is performed, the rack 3 may further move backward, for example, move backward to a position at which the rack 3 does not interfere with a next action of placing a to-be-stacked workpiece 1. In addition, the rack 3 may further move forward to drive the push plate 5 to perform a pushing operation. After stacking of the entire workpiece queue 11 is completed, the rack 3 may move to an end of the base bracket 10, for example, move to an end farthest from the reference plate 6 along the second direction, as shown in FIG. 2.

In this way, because the rack 3 can move along the second direction on the base bracket 10, the rack 3 can reach a position of to-be-stacked workpieces on the stacking table 2 and can also move back to a position at which the rack 3 does not interfere with an action of placing the to-be-stacked workpieces 1. Therefore, a stacking operation can be flexibly performed. Moreover, the shapers 4 and the push plate 5 can move forward or backward along the second direction together with the rack 3, to align the workpieces 1 along the second direction. Therefore, the workpieces 1 can be aligned separately along the first direction and the second direction. This improves stacking uniformity and compactness of the workpieces 1. Moreover, the entire rack 3 is enabled to move forward or backward along the second direction to drive the push plate 5 to move forward or backward, and no complex motion mechanism needs to be additionally arranged to avoid interference between the push plate 5 and the shapers 4. This further helps improve an automation degree and production efficiency.

In some embodiments, after the shapers 4 perform an alignment operation, the rack 3 is driven by the third driving apparatus 35 to move forward along the second direction, to drive the push plate 5 to perform a pushing operation, and the rack 3 moves backward along the second direction after the push plate 5 performs the pushing operation once with a backward movement distance greater than or equal to a forward movement distance of the rack 3 moving forward along the second direction this time.

The workpieces 1 can be aligned along both the first direction and the second direction through action fitting between the shapers 4 and the push plate 5, to form a compactly and neatly arranged workpiece queue 11. Specifically, in some embodiments, the rack 3 moves forward near a position of a to-be-stacked workpiece 1 on the stacking table 2, so that the to-be-stacked workpiece 1 is located between paired shapers 4 that are to perform an alignment operation. After the shapers 4 perform the alignment operation, the rack 3 is enabled to further move forward from a current position by a specific distance, so that the push plate 5 pushes the workpiece 1 to make the workpiece 1 be close to or in contact with an adjacent workpiece 1 located on a side of the reference plate 6. After the pushing action is performed, the rack 3 is enabled to move backward.

In this case, the rack 3 may be enabled to move backward to a starting position each time. The starting position is a position from which the rack 3 starts off along the second direction when an alignment operation needs to be performed on the first workpiece (also referred to as an initial workpiece) placed on the stacking table 2. In this case, along the second direction, a distance by which the rack 3 moves backward each time is the same as or basically the same as a distance by which the rack 3 moves forward each time. It should be noted that the distance of forward movement includes a distance by which the rack 3 moves forward from the starting position to a position at which the shapers 4 perform an alignment operation and a distance by which the rack 3 further moves forward for a pushing operation after the alignment operation is performed.

In addition, the rack 3 may alternatively not move backward to the starting position each time, but instead, the rack 3 moves backward to a position at which space for placing a to-be-stacked workpiece 1 next time is reserved. In this case, as stacking progresses, the rack 3 gradually moves backward, and a distance by which the rack 3 moves backward each time is greater than a distance by which the rack moves forward from a current position for a pushing operation.

For example, under the control of the controller, the third driving apparatus 35 may enable the rack 3 to move forward or backward with an appropriate stroke at an appropriate moment.

In this way, the third driving apparatus 35 enables the rack 3 to move forward by matching a timing of an alignment operation performed by the shapers 4, so that the push plate 5 can perform a pushing operation on an appropriate occasion, and workpieces 1 properly aligned along the first direction can be further aligned along the second direction. In addition, a gap between adjacent workpieces in the workpiece queue 11 along the second direction is reduced or even eliminated. This helps form a neat and compact workpiece queue through stacking, further helps improve shape retention of the stacked workpiece queue 11, and also reduces a necessity of aligning and shaping the workpiece queue again in a subsequent procedure. In this way, the push plate 5 is enabled to move backward along the second direction after completing one pushing operation, to continue to stack a next group of workpieces 1 without affecting the workpiece queue 11 already stacked. In addition, the backward movement distance of the rack 3 can be made to be greater than or equal to the forward movement distance of the rack 3 this time, so that starting points and ending points of the forward movement and the backward movement of the rack 3 can be flexibly set. Therefore, flexible design may be performed from the perspectives of reducing an interference risk, reducing action time of each round of alignment and stacking, and the like.

In some embodiments of this disclosure, as shown in FIG. 2, the stacking apparatus 100 includes at least one manipulator 7. The manipulator 7 is configured to place at least one workpiece 1 at a specified position on the stacking table 2 in a specified orientation. The specified position includes a position at which a tray for accommodating the workpiece 1 is located.

The manipulator 7 may be arranged in a space around or above the stacking apparatus 100, and may place a workpiece 1 grabbed from another position to a specified position on the stacking table 2 from above the stacking table 2. There may be one or more manipulators 7. The manipulator 7 may grab only one workpiece 1 at a time, or may grab two, three, four, or more workpieces at a time. During alignment in the first alignment mode, two manipulators 7 may respectively place a workpiece to undergo an alignment operation by the first shaper 41 and the second shaper 42, and a workpiece to undergo an alignment operation by the third shaper 43 and the fourth shaper 44; or one manipulator 7 may place, at a time, a workpiece to undergo an alignment operation by the first shaper 41 and the second shaper 42, and a workpiece to undergo an alignment operation by the third shaper 43 and the fourth shaper 44.

The manipulator 7 places a to-be-stacked workpiece 1 at a specified position on the stacking table 2. The to-be-stacked workpiece 1 may be directly placed on a carrying surface of the stacking table 2, and the workpiece 1 is in contact with the carrying surface of the stacking table 2 and is pushed by the shapers 4 and the push plate 5 to move on the carrying surface. Alternatively, a tray 8 may be placed on the stacking table 2, the to-be-stacked workpiece 1 is placed on a supporting surface of the tray 8, and the workpiece 1 is in contact with the supporting surface of the tray 8 and is pushed by the shapers 4 and the push plate 5 to move on the supporting surface. During a stacking operation, the tray 8 does not move relative to the stacking table 2.

The tray 8 is an apparatus for carrying the workpiece 1 and the stacked workpiece queue 11, and includes at least a bottom plate. The tray 8 may also include side plates that hold the workpiece queue 11 along the first direction and/or the second direction, and the side plates may be at positions without interfering with a stacking operation during the stacking operation. In addition, for the two types of workpiece queues 11 shown in FIG. 2 (a double-row queue on the left in the figure, and two single-row queues on the right in the figure), trays 8 with the same structure may be used, or trays 8 with different structures may be used.

In this way, to-be-stacked workpieces 1 can be placed at the specified position on the stacking table 2 in an automated manner. This further reduces labor costs and improves an automation degree of the stacking apparatus. Because the specified position includes the position at which the tray 8 for accommodating the workpiece 1 is located, the to-be-stacked workpieces 1 can be placed on the tray 8 by the manipulator 7. After the workpieces on the tray 8 are aligned and stacked, the tray 8 can directly flow out of the stacking apparatus to a next procedure. In this way, a stacked workpiece queue 11 can directly flow out of the stacking apparatus 100 together with the tray 8 without passing through the manipulator 7. This simplifies a production line device, reduces control steps, and further helps improve production efficiency. In addition, a neat workpiece queue 11 formed through stacking is directly sent out by the tray 8, so that a shape of the workpiece queue 11 can be kept.

In some embodiments, as shown in FIG. 9, the stacking table 2 includes a conveying guide rail 21. The conveying guide rail 21 is configured to enable the tray 8 (an empty tray 8 or a tray 8 carrying the workpiece queue 11) for accommodating the workpiece 1 to enter the stacking table 2 or exit the stacking table 2 along the second direction that intersects with the first direction. A stopper 26 is arranged near one end of the conveying guide rail 21 that is away from the shapers 4.

For example, the conveying guide rail 21 can enable the tray 8 for accommodating the workpiece 1 to enter the stacking table 2 or exit the stacking table 2 along the second direction that intersects with the first direction through the channel 45 and/or a channel (not shown in the figure) below the reference plate 6.

As shown in FIG. 9 and FIG. 10, the stacking apparatus 100 further includes a conveying system for the tray 8. The conveying system is arranged on the stacking table 2. Specifically, the conveying system includes the conveying guide rail 21 that is arranged on the stacking table 2 and that extends along the second direction. The tray 8 may be driven by a fourth driving apparatus 9 that serves as a driving source to enter the stacking table 2 along the conveying guide rail 21 through the channel 45 and be carried on the stacking table 2. A driving force of the fourth driving apparatus 9 may be transmitted to the tray 8 in a form of a gear and a gear rack, a sprocket and a chain, a speed chain, or the like.

In the embodiments shown in FIG. 9 and FIG. 10, a side away from the fourth driving apparatus 9 is an entrance side for the tray 8. The stopper 26 is arranged near the fourth driving apparatus 9. In the example shown in FIG. 9, two stoppers 26 are arranged. However, a quantity of stoppers 26 is not limited thereto, and there may alternatively be one or more stoppers 26. The stopper 26 may be implemented, for example, by using a blocking cylinder, or certainly, may be implemented in another form, for example, a stop block. The stopper 26 may alternatively be controlled by the controller, so that the stopper 26 can stop the tray 8 on an appropriate occasion, to make the tray 8 stop at an appropriate position.

In addition, the stacking table 2 is further provided with an information reading apparatus 28 for reading identity information of the tray 8. In a specific example, the tray 8 is configured with an electronic tag, and the information reading apparatus 28 can read the electronic tag. The information reading apparatus 28 can read the electronic tag to obtain information related to the tray 8. The information related to the tray 8 includes information about a workpiece 1 carried by the tray 8. When the workpiece 1 is a battery, the information related to the tray 8 includes specifications of the battery, an arrangement mode (for example, a single-row module or a double-row module) of a battery queue, a quantity of batteries arranged into a battery queue, and the like.

In addition, the stacking table 2 may be further provided with a position detection apparatus 29 for detecting whether the tray 8 is in place, including detecting whether the tray 8 is in place along the second direction and/or whether the tray 8 is in place along the third direction and/or whether the tray 8 is horizontal. The position detection apparatus 29 may be, for example, a commercially available position switch.

In this way, the tray 8 can automatically flow onto and out of the stacking table 2, and the tray 8 can automatically stop at a specified position. This helps improve an automation degree of the stacking apparatus 100, improve positioning accuracy for the tray 8, and improve stacking efficiency and stacking effect for workpieces 1.

In some embodiments of this disclosure, as shown in FIG. 9 and FIG. 10, the stacking table 2 further includes a jacking bracket 22 that is driven by a jacking apparatus 23 to ascend and descend along the third direction that intersects with both the first direction and the second direction. The jacking bracket 22 is configured to enable the tray 8 entering the stacking table 2 to rise or fall. The tray 8 is in a raised state during an alignment operation and a pushing operation.

In the embodiments shown in FIG. 9 and FIG. 10, the stacking table 2 includes a stacking table bracket 20 and the jacking bracket 22 that can ascend and descend relative to the stacking table bracket 20. The jacking apparatus 23 is arranged below the jacking bracket 22. For example, the jacking apparatus 23 may be implemented by using a jacking cylinder. Specifically, a cylinder body of the jacking cylinder is fastened to the stacking table bracket 20, a cylinder rod retractable relative to the cylinder body is connected to the jacking bracket 22, and the jacking bracket 22 is lifted through extension and retraction of the cylinder rod. There may be one, two, or more jacking apparatuses 23. In the examples shown in FIG. 9 and FIG. 10, there are two jacking apparatuses 23.

Some positioning apparatuses for positioning the tray 8, such as positioning posts or positioning pins 25, may also be arranged above the jacking bracket 22. The positioning posts or positioning pins 25 are at sunk positions without interfering with movement of the tray 8 when the tray 8 flows onto the stacking table 2 along the conveying guide rail 21. After the tray 8 stops under the action of the stopper 26, the jacking bracket 22 rises to get in contact with the tray 8, and the positioning posts or positioning pins 25 may also rise to fit with positioning recesses at the top of the tray 8, to implement reliable positioning for the tray 8.

Through jacking by the jacking bracket 22, the tray 8 is detached from the stacking table 2, to be specific, detached from the conveying guide rail 21.

The jacking apparatus 23 can drive the jacking bracket 22 to detach the tray 8 from the stacking table 2 during an alignment operation and a pushing operation, so that a risk of accidental movement of the tray 8 on the stacking table 2 can be reduced. This helps improve continuous positioning accuracy for the tray 8 and improve alignment accuracy for an entire workpiece queue 11.

In some embodiments of this disclosure, as shown in FIG. 10, the jacking bracket 22 includes a synchronous lifter 24. The synchronous lifter 24 may be a commercially available synchronous lifter. With the synchronous lifter 24, even if the jacking bracket 22 and the tray 8 jacked by the jacking bracket 22 have large areas, the tray 8 can ascend and descend smoothly.

In this way, the tray 8 can smoothly ascend and descend. This reduces adverse conditions such as workpiece shifting and workpiece queue shape changes due to inclination of the tray 8.

In some embodiments of this disclosure, as shown in FIG. 9, the stacking apparatus 100 further includes a detection apparatus 27 for detecting a quantity of stacked workpieces 1 in the workpiece queue 11.

As shown in FIG. 9 and FIG. 2, the detection apparatus 27 is arranged on a side, away from the reference plate 6, of the stacking table 2. The detection apparatus 27 may be configured to be able to ascend and descend relative to the jacking bracket 22 along the third direction. In this way, when the tray 8 enters the stacking table 2, the detection apparatus 27 descends to a position without interfering with movement of the tray 8, and when the tray 8 is in place and is jacked by the jacking bracket 22 to be in a state ready for placing a to-be-stacked workpiece 1, the detection apparatus 27 is at a raised position, so that the workpieces 1 in the workpiece queue 11 on the tray 8 can be detected. For example, the detection apparatus 27 may be a rangefinder, and determine a quantity of stacked workpieces by detecting a distance between the detection apparatus 27 and a tail workpiece of the workpiece queue 11. It should be noted that the tail workpiece of the workpiece queue 11 is a workpiece, in the stacked and shaped workpiece queue 11, that is at a position farthest away from the reference plate 6.

In this way, the quantity of stacked workpieces in the stacked workpiece queue 11 can be detected, so that a current stacking status (for example, the quantity of stacked workpieces and a tail position of the workpiece queue) can be learned of, and then accurate control can be performed based on the current stacking status.

In some embodiments of this disclosure, the intersection includes perpendicular intersection.

As described above, the first direction, the second direction, and the third direction are directions that intersect with each other, and the intersection herein includes a case of perpendicular intersection.

In this way, a workpiece queue can be stacked along two perpendicular directions on a plane. This is especially suitable for stacking of cuboid-shaped workpieces.

The following describes actions of the stacking apparatus 100.

The stacking apparatus 100 may carry the workpiece 1, for example, by using the tray 8. For example, the tray 8 may flow onto the stacking table 2 of the stacking apparatus 100 from a previous procedure through a conveyor belt. The jacking bracket 22 is driven by the jacking apparatus 23 to jack the tray 8 flowing onto the stacking table 2, so that the tray 8 is detached from a transport line of a production line.

When the tray 8 is jacked in place, a user or the manipulator 7 places a to-be-stacked workpiece 1 on the tray 8. The rack 3 with the shapers 4 at ready positions moves forward along the second direction to a position corresponding to the to-be-stacked workpiece 1, and a stacking operation is completed through an alignment operation by shapers 4 acting in pairs and a pushing operation by the push plate 5. The jacking bracket 22 is driven by the jacking apparatus 23 to lower the tray 8 to a position in contact with the conveying guide rail 21. Under driving by the fourth driving apparatus 9, a neat workpiece queue 11 formed through stacking is conveyed to a next procedure together with the tray 8, to undergo a subsequent operation such as pressurization.

A second aspect of this disclosure provides a battery production line. The battery production line includes at least one stacking apparatus 100 according to any one of the foregoing embodiments, and further includes a tray 8 for placing a workpiece 1.

In the battery production line provided in some embodiments of this disclosure, an entire workpiece queue 11 formed through stacking is conveyed to a subsequent processing position together with the tray 8. Therefore, when the stacking apparatus 100 is used to stack workpieces, to-be-stacked workpieces 1 are placed on the tray 8 on a stacking table 2.

In addition, the battery production line may further include a conveying line, and the conveying line may include a conveying line for conveying the tray 8 and a conveying line for conveying the to-be-stacked workpieces 1. The conveying line for conveying the tray 8 may be connected to the stacking table 2 of the stacking apparatus 100, so that the tray 8 can flow onto the stacking table 2 through the conveying line. The conveying line for conveying the to-be-stacked workpieces 1 may convey the to-be-stacked workpieces 1 to a position near the stacking apparatus 100, and a manipulator 7 or the like grabs the to-be-stacked workpieces 1 and places them on the tray 8 on the stacking table 2.

For example, the conveying line may be a conveyor belt, for example, a strip-shaped object such as a belt, or may be a plurality of rollers arranged side by side, or may be a plurality of chains.

As shown in FIG. 1 and FIG. 2, in some embodiments of this disclosure, the battery production line may include two stacking apparatuses 100. The two stacking apparatuses 100 may be two independent stacking apparatuses 100, or may have a structure in which a base bracket 10 is shared, as shown in FIG. 1 and FIG. 2. Certainly, the battery production line may alternatively include only one stacking apparatus 100 or three or more stacking apparatuses 100.

In this way, workpieces 1 can be quickly and neatly stacked in an automated manner, to achieve higher stacking efficiency and adapt to stacking of batteries with different sizes in a plurality of manners, such as stacking of a single row of batteries and stacking of double rows of batteries. This achieves good compatibility and facilitates flexible production of an entire battery production line. Moreover, two or more stacking apparatuses may alternatively be arranged to share a conveying line channel for conveying to-be-stacked workpieces (to-be-stacked batteries) and cooperate with each other in terms of an action timing, to reduce production takt time. In addition, because the workpieces are placed on the tray, a neatly stacked workpiece queue can be directly sent to a next processing device by using the tray, without transferring the neatly stacked workpiece queue by using another carrying apparatus.

In some embodiments of this disclosure, the workpiece 1 includes at least either of a battery and a battery unit obtained by combining at least two batteries, and the workpiece queue 11 includes at least either of a battery queue formed by arranging a single row of batteries and a battery unit queue formed by arranging battery units.

In this way, the stacking apparatus can be used for stacking batteries and is compatible with battery queues with different specifications, for example, is compatible with a single-row battery queue formed by arranging a single row of batteries and a double-row battery queue formed by arranging double rows of batteries. This improves compatibility (flexibility) of the stacking apparatus and even the entire battery production line, and can further improve production efficiency of battery assembly.

A third aspect of this disclosure provides a stacking method for stacking workpieces into a neat workpiece queue 11. As shown in FIG. 12, the stacking method includes the following steps.

S100: Place the first workpiece.

S200: Perform a step of aligning and pushing the first workpiece, where two end faces of the first workpiece along a first direction are pushed, through an alignment operation by shapers that act in pairs, to be aligned with each other, and an end face of the first workpiece along a second direction is pushed by a push plate to perform a pushing operation.

S300: Perform an alignment step which enables a subsequent workpiece to be placed in such a way that the subsequent workpiece and the first workpiece face a same direction, where two end faces of the subsequent workpiece along the first direction are pushed through the alignment operation by the shapers, so that the two end faces of the subsequent workpiece along the first direction are aligned with the two end faces of the first workpiece along the first direction.

S400: Perform a pushing step, where after the alignment step, an end face of the subsequent workpiece that is farthest away from the first workpiece along the second direction is pushed through a pushing operation by the push plate, so that the subsequent workpiece approaches a workpiece adjacent to the subsequent workpiece along the second direction.

S500: Determine whether a workpiece queue has a predetermined length.

The alignment step and the pushing step are repeated until a workpiece queue with the predetermined length is formed through stacking.

Certainly, persons skilled in the art should understand that, if a workpiece queue with the predetermined length can be form through stacking by performing the alignment step and the pushing step only once, stacking ends, and the alignment step and the pushing step are no longer repeated. To be specific, a stacked workpiece queue can be directly conveyed to a next procedure after the alignment step and the pushing step are performed once.

In step S100, for example, a manipulator 7 may grab a workpiece 1 conveyed by a workpiece conveying line and place the workpiece 1 on a tray 8 on a stacking table 2.

In step S200, shapers 4 acting in pairs perform an alignment operation to align the first workpiece, and a push plate 5 performs a pushing operation on the first workpiece, so that a center line of the first workpiece is aligned, and the first workpiece abuts against a reference plate 6 along the second direction.

In step S300, a workpiece following the first workpiece, namely, a subsequent workpiece, is placed in such a way that the subsequent workpiece and the first workpiece face a same direction. A battery is used as an example. The facing a same direction means that, if the first workpiece is placed in such an orientation that a large surface faces the second direction, a side surface faces the first direction, and an electrode terminal faces upward, the subsequent workpiece is also placed in this orientation. Two end faces of the subsequent workpiece along the first direction are pushed through the alignment operation by the shapers, and therefore the two end faces of the subsequent workpiece along the first direction are aligned with the two end faces of the first workpiece along the first direction. In addition, herein, the first workpiece may be one or more workpieces in the workpiece queue 11 that are first placed on the stacking table 2.

In step S400, a rack 3 drives the push plate 5 to perform a pushing operation to push the last workpiece in a current queue, so that the workpiece moves close to an adjacent workpiece.

In step S500, for example, whether a current workpiece queue 11 has the predetermined length is detected by a detection apparatus 27. Based on a detection result of the detection apparatus 27, if the current workpiece queue 11 has a specified length, it indicates that a required workpiece queue 11 has been formed through stacking, and the process proceeds to the end of current stacking; or if the current workpiece queue 11 does not have a specified length, it indicates that a workpiece 1 further needs to be placed for stacking, and therefore the alignment step and the pushing step are repeated until a workpiece queue 11 with the predetermined length is formed through stacking. In this way, a required workpiece queue 11 is formed through stacking.

Because alignment of a workpiece 1 can be implemented by pushing two end faces of the workpiece from two sides along the first direction, a neat workpiece queue 11 with two end faces aligned along the first direction can be easily formed. After the two end faces of the workpiece along the first direction are aligned, an end face of the last workpiece 1 in the queue along the second direction is further pushed to approach a side of the first workpiece, so that the workpiece queue 11 can further become neat and compact along the second direction. This further improves neatness of the workpiece queue 11, so that a neat workpiece queue 11 can be formed through stacking.

In some embodiments of this disclosure, the workpiece 1 includes at least either of a battery and a battery unit obtained by combining at least two batteries, and the workpiece queue 11 includes at least either of a battery queue formed by arranging a single row of batteries and a battery unit queue formed by arranging battery units.

In this way, the stacking apparatus can be used for stacking batteries and is compatible with battery queues with different specifications, for example, is compatible with a single-row battery queue formed by arranging a single row of batteries and a double-row battery queue formed by arranging double rows of batteries. This improves compatibility (flexibility) of the stacking apparatus and even the entire battery production line, and can further improve production efficiency of battery assembly.

A fourth aspect of this disclosure provides a stacking method for stacking workpieces 1 into a neat workpiece queue 11 by using a stacking apparatus 100. The stacking apparatus 100 has a stacking table 2 and shapers 4. As shown in FIG. 13, the stacking method includes the following steps.

S1000: Perform a placement step, where to-be-stacked workpieces are placed on a tray carried on the stacking table.

S2000: Perform an in-place step, where at least two shapers are made to be at ready positions to prepare for an alignment operation, and the shapers are moved forward along a second direction to positions corresponding to the to-be-stacked workpieces.

S3000: Perform an alignment step, where shapers that act in pairs are made to perform an action of approaching each other along a first direction until shaping surfaces of the shapers are in contact with the to-be-stacked workpieces, so that the to-be-stacked workpieces are aligned.

In this way, after the alignment operation is performed on the workpieces along the first direction, the pushing operation can be performed on the workpieces 1 by using the stacking apparatus, 100 so that the workpieces are aligned along the second direction. To be specific, a gap between adjacent workpieces in the workpiece queue 11 along the second direction can be reduced or even eliminated, so that a neatly and compactly arranged workpiece queue 11 is obtained. In addition, after one pushing operation is completed, the shapers 4 are enabled to move backward along the second direction, so that a next group of to-be-stacked workpieces can be placed.

In some embodiments of this disclosure, the stacking apparatus 100 further includes a rack 3 and a push plate 5, the shapers 4 and the push plate 5 are all connected to the rack 3, and the rack 3 is configured to be able to move forward or backward along the second direction above the stacking table 2. As shown in FIG. 14, after step S3000, the stacking method further includes the following steps.

S4000: Perform a pushing step, where the rack provided with the push plate is moved forward along the second direction in a state in which the push plate descends to a second position, until the push plate presses against the workpiece, to perform a pushing operation.

S5000: Perform a backward movement step, where the rack is moved backward along the second direction.

In this way, after the alignment operation is performed on the workpieces 1 along the first direction, the pushing operation can be performed on the workpieces 1 by using the stacking apparatus 100, so that the workpieces are aligned along the second direction. To be specific, a gap between adjacent workpieces 1 in the workpiece queue 11 along the second direction can be reduced or even eliminated, so that a neatly and compactly arranged workpiece queue 11 is obtained. In addition, after one pushing operation is completed, the rack is enabled to move backward along the second direction, so that a next group of to-be-stacked workpieces can be placed.

In some embodiments of this disclosure, as shown in FIG. 15, step S1000 includes the following steps.

S1001: Determine whether the stacking table is an empty stacking table.

Herein, if it is determined that the stacking table 2 is an empty stacking table, the tray 8 is allowed to flow onto the stacking table 2; otherwise, the tray 8 is not allowed to flow onto the stacking table 2.

S1002: Make the tray flow onto the stacking table determined as empty.

S1003: Determine that the tray on the stacking table has reached a specified position.

S1004: Read information about the tray, and determine whether the tray is a tray for a first alignment mode or a tray for a second alignment mode.

The tray for the first alignment mode is configured to carry a first workpiece queue. The tray for the second alignment mode is configured to carry a second workpiece queue. A length dimension of the second workpiece queue along the first direction is different from a length dimension of the first workpiece queue along the first direction.

S1005: Place the to-be-stacked workpieces on the tray.

In step S1001, for example, a through-beam photoelectric sensor may be used to determine whether the stacking table 2 is an empty stacking table.

In step S1002, for example, a fourth driving apparatus 9, a conveying guide rail 21, a jacking apparatus 23, or a jacking bracket 22 may be used to make the tray 8 enter the stacking table 2 and be jacked to a specified position.

In step S1003, for example, an in-place sensor such as a position detection apparatus 29 may be used to determine that the tray 8 has reached the specified position on the stacking table.

In step S1004, an information reading apparatus 28 is used to read an electronic tag of the tray 8, to obtain information related to the tray 8, for example, sizes and an arrangement mode of the workpieces 1, and whether alignment and stacking need to be performed in the first alignment mode or the second alignment mode.

When the workpiece 1 is a battery, the information related to the tray 8 includes specifications of the battery, an arrangement mode (for example, a single-row module or a double-row module) of a battery queue, a quantity of batteries arranged into a battery queue, and the like.

It should be noted that the tray for the first alignment mode or the tray for the second alignment mode indicates whether a workpiece queue 11 stacked on the tray is stacked in the first alignment mode or the second alignment mode, and the tray 8 does not necessarily refer to trays with different structures. Certainly, two types of trays 8 with different structures may alternatively be arranged. For example, one type of tray is configured to carry two single-row workpiece queues formed through stacking in the first alignment mode, and the other type of tray is configured to carry one double-row workpiece queue formed through stacking in the second alignment mode.

In the stacking apparatus 100, whether to allow the tray 8 to flow onto the stacking table 2 is determined based on a result of determining whether the stacking table 2 is an empty stacking table. This can prevent the tray 8 from accidentally entering a stacking table 2 on which there is still another tray 8. Whether the tray 8 is a tray for the first alignment mode or a tray for the second alignment mode is determined, so that whether the first workpiece queue or the second workpiece queue is to be stacked currently can be easily determined, and an action to be subsequently performed can be easily determined. In addition, because the tray 8 is scheduled according to a production requirement of a downstream procedure of the stacking apparatus, a neat first workpiece queue and second workpiece queue can be formed through stacking according to the production requirement of the downstream procedure. A workpiece is placed on the tray on a basis of determining that the tray on the stacking table has reached the specified position, so that a workpiece can be placed in an accurate and timely manner through timing matching.

In some embodiments of this disclosure, a first shaper 41, a second shaper 42, a third shaper 43, and a fourth shaper 44 are sequentially arranged on the rack 3 along the first direction. As shown in FIG. 16, step S2000 includes the following steps.

S2001: Determine, based on a determining result for the tray, to perform an alignment operation in one of the first alignment mode and the second alignment mode.

Herein, if it is determined that the tray 8 is a tray for the first alignment mode, it is determined that an alignment operation is to be performed in the first alignment mode; or if it is determined that the tray is a tray for the second alignment mode, it is determined that an alignment operation is to be performed in the second alignment mode.

S2002: Make, based on a determined alignment mode, the shapers on the rack to be at ready positions to prepare for an alignment operation.

Herein, if it is determined that an alignment operation is to be performed in the first alignment mode, the first shaper 41 and the second shaper 42 are made to be at positions away from each other along the first direction, and the third shaper 43 and the fourth shaper 44 are made to be at positions away from each other along the first direction; or if it is determined that an alignment operation is to be performed in the second alignment mode, the second shaper 42 and the third shaper 43 are made to be at positions away from each other along the first direction, and the first shaper 41 and the fourth shaper 44 are made to be at standby positions.

S2003: Determine whether the first workpiece queue or the second workpiece queue exists on the tray.

If neither of the first workpiece queue and the second workpiece queue exists, the following step is performed:

S2004: Place the first workpiece.

Determining is performed again after the first workpiece is placed. If the first workpiece queue or the second workpiece queue exists, the following steps are performed:

S2005: Determine a queue tail position of the first workpiece queue or the second workpiece queue.

S2006: Make the rack to move forward along the second direction to a position corresponding to the queue tail position.

In step S2005, for example, a detection apparatus 27 arranged on the stacking table 2 may measure a distance between the detection apparatus 27 and the last workpiece in a current workpiece queue. A moving portion 36 of the rack 3 is controlled, based on the distance, to move to a corresponding position. At the position, a to-be-stacked workpiece 1 is located between shapers 4 at ready positions.

An alignment mode to be performed is determined by using the stacking apparatus 100 based on a determining result for the tray. Therefore, whether the first workpiece queue or the second workpiece queue is to be stacked currently can be easily determined, and an alignment mode to be performed can be easily determined. In addition, based on the determined alignment mode, the first shaper 41, the second shaper 42, the third shaper 43, and the fourth shaper 44 are correspondingly enabled to be respectively at ready positions to prepare for an alignment operation, so that a required workpiece queue can be accurately stacked according to a production requirement. In addition, whether a workpiece queue exists on the tray is determined. If a workpiece queue exists, a tail position of the workpiece queue is determined, and the rack is further enabled to move forward along the second direction to a position corresponding to the tail position. In this way, the rack, and the shapers, the push plate, and the like that are arranged on the rack can accurately move to corresponding positions, so that an alignment operation can be reliably performed to stack workpieces.

In some embodiments, the tray for the first alignment mode carries two first workpiece queues, and the tray for the second alignment mode carries one second workpiece queue. In step S3000, shapers 4 that act in pairs on the rack 3 are made, based on the determined alignment mode, to perform an action of approaching each other along the first direction until shaping surfaces 4*a* of the shapers 4 are in contact with the workpieces 1, so that the workpieces 1 are aligned. Herein, if it is determined that an alignment operation is to be performed in the first alignment mode, the first shaper 41 and the second shaper 42 perform an approaching action, and the third shaper 43 and the fourth shaper 44 perform an approaching action; or if it is determined that an alignment operation is to be performed in the second alignment mode, the first shaper 41 and the fourth shaper 44 stay at standby positions, and the second shaper 42 and the third shaper 43 perform an approaching action.

In the stacking apparatus 100, the first shaper 41, the second shaper 42, the third shaper 43, and the fourth shaper 44 are enabled to respectively perform corresponding actions based on the determined alignment mode, so that two first workpiece queues or one second workpiece queue can be aligned according to a requirement, to form a neat workpiece queue through stacking. This can implement compatibility with stacking of workpieces 1 with different specifications and sizes and workpiece queues 11 in different arrangement modes.

In some embodiments of this disclosure, at least two stacking apparatuses 100 are used, and each stacking apparatus 100 includes a stacking table 2 and a rack 3. In step S1001, determining is separately performed for the stacking table 2 in each stacking apparatus 100. As shown in (a) of FIG. 17, if it is determined that one of the stacking tables 2 is an empty stacking table, the tray 8 is allowed to flow onto the empty stacking table. As shown in (c) of FIG. 17, if it is determined that all the stacking tables 2 are empty stacking tables, the tray 8 is allowed to flow onto any one of the empty stacking tables. As shown in (b) of FIG. 17, if it is determined that all the stacking tables 2 are non-empty stacking tables, the tray is not allowed to flow onto any stacking table 2. In FIG. 17, a "stacking table No. 1" represents a first stacking table, a "stacking table No. 2" represents a second stacking table, and a "stacking table No. n" represents an $n^{th}$ stacking table, where n is a natural number greater than or equal to 3.

Two or more stacking apparatuses can share a conveying line channel for conveying to-be-stacked workpieces, and cooperate with each other in terms of an action timing. This reduces production takt time and can further improve stacking efficiency.

In some embodiments of this disclosure, the in-place step, the alignment step, the pushing step, and the backward movement step are separately performed for each stacking apparatus.

A first stacking apparatus and a second stacking apparatus can be used to separately perform stacking operations to form, through stacking, neat workpiece queues corresponding to a production requirement, so that stacking efficiency is high. This helps improve production efficiency of an entire production line. Moreover, the first stacking apparatus and the second stacking apparatus can alternatively cooperate with each other in terms of an action timing to reduce production takt time.

In some embodiments of this disclosure, as shown in FIG. 18, before step S1000, the stacking method further includes the following step:

S0009: Determine that the tray has reached a predetermined position.

Herein the predetermined position is an upstream-side adjacent position relative to the stacking table in a flow path of the tray.

Herein, for example, a position switch may be used for detection.

Before the placement step, it is determined that a tray has reached a predetermined position. Therefore, the placement step and even an entire stacking process may be started when a tray reaches a predetermined position. This can improve an automation degree of production control. In addition, a tray can be scheduled in a timely manner according to a production requirement of a downstream procedure of the stacking apparatus, and a stacking operation matching the production requirement can be performed in a timely manner.

In some embodiments of this disclosure, in step S1003, it is determined that the tray has reached the specified position along both the second direction and a third direction.

In this way, to-be-stacked workpieces can be accurately placed at an appropriate position in the tray on the stacking table, and a risk of misoperation is reduced.

In some embodiments of this disclosure, the workpiece 1 includes at least either of a battery and a battery unit obtained by combining at least two batteries, and the workpiece queue 11 includes at least either of a battery queue formed by arranging a single row of batteries and a battery unit queue formed by arranging battery units.

In this way, the stacking apparatus can be used for stacking batteries and is compatible with battery queues with different specifications, for example, is compatible with a single-row battery queue formed by arranging a single row of batteries and a double-row battery queue formed by arranging double rows of batteries. This improves compatibility (flexibility) of the stacking apparatus and even the entire battery production line, and can further improve production efficiency of battery assembly.

The following describes specific examples of some embodiments of this disclosure with reference to the accompanying drawings.

In a specific example, two groups of single-row battery cells are stacked. The stacking apparatus 100 includes a stacking table 2, a gantry rack (the rack 3), four clamping plates (the shapers 4), a jacking mechanism, and a strip-shaped push block (the push plate 5). The four clamping plates and the strip-shaped push block are kept on the gantry rack. When a tray flows to a specified position on the stacking table 2, the tray is jacked by the jacking mechanism and detached from a production line, and a mechanism (the manipulator) not shown in the figure places two groups of battery cells to a specified position on the tray in a specified orientation. When a controller recognizes that there are two groups of battery cells on the tray, a side plate of the tray is opened through a baffle opening air cylinder, and the stacking apparatus is automatically controlled to perform the first alignment mode, so that a first clamping plate and a fourth clamping plate are driven by a flap servo motor (the first driving apparatus 33) to move toward each other, and the first clamping plate and the fourth clamping plate respectively approach a second clamping plate and a third clamping plate. The first clamping plate and the second clamping plate clamp one group of battery cells. The third clamping plate and the fourth clamping plate clamp the other group of battery cells. The four clamping plates simultaneously perform clamping and alignment operations on the two groups of battery cells.

In this way, through pairwise fitting between the four clamping plates, alignment operations can be simultaneously performed on the two groups of battery cells with a simple structure, so that the two groups of battery cells can be quickly and neatly aligned. This effectively improves operation efficiency of the stacking apparatus 100.

After a stacking operation is completed, the strip-shaped push block descends to a second position, and the gantry rack moves along a direction (the second direction) toward aligned battery cells under the control of the controller, to drive the strip-shaped push block to move forward to perform a pushing operation on the battery cells. In this way, the two groups of battery cells are stacked into two battery cell queues, and battery cells in each battery cell queue approach each other as close as possible.

After the pushing operation is completed, the controller controls the gantry rack to move backward to an initial position, and the strip-shaped push block ascends to a first position, to form a channel below the strip-shaped push block. This avoids interference with transmission of a next tray and a next group of to-be-stacked battery cells.

The stacking operation and the pushing operation are repeated until a length of a battery cell queue reaches a length preset on a host computer, and the battery cell queue automatically flows to a next procedure.

The stacking apparatus 100 in this specific embodiment of this disclosure can implement automatic feeding, automatic alignment, and automatic stacking, and quickly and neatly stack battery cells. This improves an automation degree and also effectively reduces labor costs. In addition, two groups of battery cells can be simultaneously aligned and stacked. This improves production efficiency, reduces production costs, and better facilitates flexible production.

Moreover, the controller can automatically adjust, based on actual sizes of the battery cells, a spacing distance between clamping plates that are clamped with each other, and the stacking apparatus 100 can adapt to battery cells with various sizes, so that higher compatibility is achieved.

The following describes a specific action process by using a battery stacking scenario as an example.

First, the controller determines whether a tray 8 exists on the stacking table 2, and if a tray 8 exists, the controller determines that the tray 8 is in place, and reads information about the tray 8. When the controller determines that a tray exists at a specified position, a to-be-stacked battery is placed on the tray 8.

When the controller determines that no tray 8 exists at the specified position, the controller enters a current action process: waiting for a tray 8 on a conveying line to enter the specified position on the stacking table 2. To be specific, the controller determines whether a tray exists at a stacking frontend on the conveying line, and when a tray exists at a stacking frontend on a production line, the controller controls a stacking motor that serves as the fourth driving apparatus 9 to start operating, to release the tray on the conveying line, so that the module tray enters the specified position on the stacking table 2. Then the stacking motor is controlled to stop operating.

When no tray 8 exists on the conveying line, no tray 8 can enter the stacking table 2 at this time, and the controller starts to wait for a period of time, which is usually at least one production takt, for example, several seconds. When waiting starts, the controller controls the stacking motor to start operating. After a tray 8 on the conveying line enters the stacking table 2, the controller controls the stacking motor to stop operating.

During implementation, two stacking tables 2, namely, two stacking stations, may be arranged, and each stacking table 2 is provided with a stacking motor. The stacking motor provides a driving force for the conveying line during operation, so that a tray on the conveying line flows to the specified position on the stacking table 2. When a tray exists at the specified position on the stacking table 2, the controller controls the stacking motor to stop operating, so that a tray on the conveying line does not enter the specified position on the stacking table.

The stacking table 2 is further provided with two stoppers 26 and a rangefinder that serves as the detection apparatus 27. The stopper 26 is configured to prevent the tray from moving excessively, and the rangefinder is configured to detect a distance between the rangefinder and the last battery in a current battery queue on the tray. The rangefinder periodically or aperiodically measures the distance, and sends the distance to the controller. The controller determines a quantity of rows in a stacked battery queue based on the distance and a thickness of the battery (the thickness of the battery may be determined based on product information of the battery). To be specific, the quantity of rows in the stacked battery queue is obtained by dividing the distance by the thickness of the battery.

During implementation, an industrial in-place sensor (also referred to as a position sensor) that serves as the position detection apparatus 29 may be arranged to detect whether the tray has reached a designated position. If the in-place sensor detects that the tray 8 has reached the designated position, the in-place sensor sends tray arrival information to the controller, and the controller determines, based on the tray arrival information sent by the in-place sensor, that the tray has reached the designated position. Usually, the in-place sensor can detect a position of an object, relative movement of a position, or a continuous change status of a position.

After a tray enters the specified position on the stacking table 2, the controller controls a jacking cylinder that serves as the jacking apparatus 23 on the stacking table 2 to start operating, and the jacking cylinder drives a jacking bracket 22 on the stacking table 2 to jack the tray 8, so that the tray is detached from the conveying line.

During implementation, the tray is further provided with a sensor (referred to as a leveling sensor below) for detecting whether the tray is placed stably. For example, the leveling sensor is implemented by using a proximity switch sensor, and a pair of proximity switch sensors are respectively arranged on opposite sides at the bottom of the tray, for example, at two corners on one side or at two diagonal corners.

After a tray is in place, the controller receives a leveling signal sent by the leveling sensor. When the leveling signal indicates that the tray is stable, the controller reads an electronic tag (for example, battery-related information stored in an RFID) on the tray through a barcode scanner that serves as the information reading apparatus 28, and determines, based on the read battery-related information, whether a to-be-stacked battery module on the tray is a single-row battery module or a double-row battery module.

The controller controls the tray 8 to be in a state ready for placing a to-be-stacked battery.

The rangefinder detects a distance, and sends the detected distance to the controller. The controller determines, based on the distance, whether a tray exists on the stacking table 2. For example, a distance in a case in which a tray 8 exists on the stacking table is less than a distance in a case in which no tray 8 exists. Alternatively, the controller determines whether a tray 8 exists based on whether the detected distance is within a preset range.

The controller further determines a quantity of rows of stacked batteries on the tray 8 based on the detected distance.

The controller determines whether a battery exists on the tray based on a quantity of rows (possibly 0 rows) in a stacked battery queue. When it is determined that no battery exists on the tray, the first workpiece is placed. When it is determined that batteries exist on the tray, whether the batteries have undergone a preset series of stacking for a workpiece queue is determined. If it is determined, based on the quantity of rows in the stacked battery queue, that the batteries on the tray have been stacked, the controller controls the tray to enter a state of keeping the battery queue. If it is determined, based on the quantity of rows in the stacked battery queue, that the batteries on the tray have not been stacked, stacking continues to be performed.

Regardless of whether no battery exists on the tray or batteries have been stacked or have not been stacked, the controller can obtain a quantity of stacked batteries that is stored by the controller (for example, the quantity is determined based on a quantity of batteries grabbed by a stacking robot or a quantity of times of grabbing), and determine whether the quantity of stacked batteries that is stored by the controller is consistent with a quantity of batteries that is determined based on a distance (a quantity of rows of batteries needs to be converted into the quantity of batteries). If the quantities are consistent, stacking continues to be performed. If the quantities are inconsistent, an alarm is generated, or the stored quantity of stacked batteries is updated to the quantity of batteries that is determined based on the distance.

It should be noted that a tray flowing from the conveying line onto the stacking table 2 is usually an empty tray. The stacking robot (the manipulator 7) places a grabbed battery on the tray. The shapers 4 on the stacking table 2 align batteries placed on the tray, and stack the batteries to form a battery module. In some embodiments, the stacking robot may grab a battery or a battery unit obtained through battery assembly. The battery unit obtained through battery assembly is usually at least two batteries fastened together, for example, two, three, or four batteries.

When the controller determines that no battery exists on the tray, a subsequent process of placing the first workpiece is performed. The process of placing the first workpiece includes: The controller controls the stacking robot to grab a battery and place the battery on the tray, and then the controller controls the shapers 4 to align the battery placed on the tray. During implementation, each time the stacking robot places a battery on the tray, the controller may control the shapers 4 to align some or all of batteries placed on the tray. Alternatively, after the stacking robot continuously places batteries on the tray at least twice, the controller may control the shapers 4 to shape some or all of batteries placed on the tray.

It should be noted that the stacking robot also counts a quantity of batteries placed onto one tray or a quantity of times of grabbing, and the stacking robot may send the count to the controller. The controller determines a quantity of grabbed batteries based on the count. If the quantity of grabbed batteries is consistent with a quantity of batteries that is determined based on a ranging sensor, the controller determines that a detection result is normal. If the quantities are consistent, the controller determines that a detection result is abnormal, and then generates an alarm. If the detection result is normal, the controller determines that the stacking robot has finished grabbing and stacking of a module is completed.

After stacking is completed, the controller further determines, based on product information, whether the module is a single-row module or a double-row module. If the module is a single-row module, the controller binds related information such as information about the single-row module and a work number, and then stores the information. If the module is a double-row module, the controller binds related information such as information about the double-row module and a work number, stores the information, and writes the stored information to an electronic tag of a module tray.

After determining that stacking on the module tray is completed, the controller resets all electrical mechanical parts (servo motors, air cylinders, and the like), and after the information is written to the electronic tag of the tray, controls the stacking motor to continue to operate, so that the module tray on which stacking is completed flows out, and an empty module tray flows to the designated position on the stacking table.

After stacking on a current tray is completed, the controller determines whether a work order has been completed. If the work order is completed, it is determined that all stacking is completed. The controller records a quantity of completed modules and writes a current station number to the module tray for recording, and then may switch to a new work order. If the work order has not been completed, the controller records a quantity of completed modules and a quantity of uncompleted modules. When stacking of a module is completed, the controller decreases the quantity of uncompleted modules by 1, and repeats a process of continuing to perform stacking until the work order is completed.

When stacking is completed for the work order, the controller controls an empty tray and remaining surplus materials to flow out of the stacking table 2.

The foregoing embodiments are merely intended to describe the technical solutions of this disclosure, but not to limit this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of this disclosure. All such modifications and equivalent replacements shall fall within the scope of this disclosure. In particular, as long as there is no structural conflict, the various technical features mentioned in the embodiments can be combined in any manner.

INDUSTRIAL PRACTICABILITY

Embodiments of this disclosure provide a stacking apparatus, a battery production line, and a stacking method, to quickly and neatly stack batteries or stack battery units for battery assembly in an automated manner. The stacking apparatus and the battery production line can quickly and neatly stack workpieces in an automated manner, with good compatibility and high production efficiency. The stacking method helps improve stacking efficiency and stacking effect.

What is claimed is:

1. A stacking apparatus, comprising:
a base bracket;
a stacking table for carrying at least one workpiece, wherein the stacking table is arranged on the base bracket; and
at least two shapers arranged on the base bracket, wherein the shapers act in pairs to perform an alignment operation for aligning workpieces on the stacking table,
wherein:
paired shapers are configured in such a way that at least one of the actions enables the paired shapers to approach or move away from each other along a first direction above the stacking table, and the alignment operation is performed through the approaching action of the shapers, to obtain a neat workpiece queue through stacking;
the at least two shapers are sequentially arranged along the first direction, any two adjacent shapers are configured to be able to approach or move away from each other along the first direction, and the alignment operation is performed through the approaching action; and
the shapers comprise a first shaper, a second shaper, and a third shaper that are sequentially arranged along the first direction, the first shaper and the second shaper are configured to be able to approach or move away from each other along the first direction, and the second shaper and the third shaper are configured to be able to approach or move away from each other along the first direction.

2. The stacking apparatus according to claim 1, further comprising:
a push plate for performing a pushing operation on the workpiece, wherein the push plate is arranged on the base bracket and is configured to be able to move forward or backward along a second direction that intersects with the first direction, and the pushing operation is performed through the forward movement action of the push plate; and
a reference plate, arranged on the base bracket and arranged on an opposite side of the push plate along the second direction, and configured to block the workpiece.

3. The stacking apparatus according to claim 2, wherein:
the push plate is configured to be able to ascend and descend between a first position and a second position at which the pushing operation is performed, and when the push plate ascends to the first position, a channel is formed below the push plate.

4. The stacking apparatus according to claim 2, wherein each shaper has a shaping surface facing an adjacent shaper, and the shaping surface is used for contact with the workpiece.

5. The stacking apparatus according to claim 2, further comprising:
a rack, wherein the rack is arranged on the base bracket in a manner of being movable relative to the base bracket, and is configured to be able to move forward or backward along the second direction above the stacking table under driving by a third driving apparatus; and the shapers and the push plate are all connected to the rack, and move forward or backward along the second direction together with the rack.

6. The stacking apparatus according to claim 5, wherein:
after the shapers perform the alignment operation, the rack is driven by the third driving apparatus to move forward along the second direction, to drive the push plate to perform the pushing operation, and the rack moves backward along the second direction after the push plate performs the pushing operation once with a backward movement distance greater than or equal to a forward movement distance of the rack moving forward along the second direction this time.

7. The stacking apparatus according to claim 2, wherein:
the stacking table further comprises a jacking bracket that is driven by a jacking apparatus to ascend and descend along a third direction that intersects with both the first direction and the second direction, the jacking bracket is configured to enable a tray entering the stacking table to rise or fall, and the tray is in a raised state during the alignment operation and the pushing operation.

8. The stacking apparatus according to claim 7, wherein:
the jacking bracket comprises a synchronous lifter.

9. The stacking apparatus according to claim 2, wherein the intersection comprises perpendicular intersection.

10. The stacking apparatus according to claim 1, wherein:
the shapers further comprise a fourth shaper, the third shaper and the fourth shaper are configured to be able to approach or move away from each other along the first direction.

11. The stacking apparatus according to claim 10, wherein:
the stacking apparatus further comprises a controller, wherein the controller performs control so that the stacking apparatus performs the alignment operation in one of a first alignment mode and a second alignment mode and is able to switch between the first alignment mode and the second alignment mode;
in the first alignment mode, the first shaper and the second shaper perform the alignment operation, and/or the third shaper and the fourth shaper perform the alignment operation; and
in the second alignment mode, the second shaper and the third shaper perform the alignment operation, and the first shaper and the fourth shaper are in a standby state.

12. The stacking apparatus according to claim 11, wherein:
the first shaper and the fourth shaper are connected to a first screw rod, a first driving apparatus is connected to the first screw rod, and the first shaper and the fourth shaper are driven by the first driving apparatus to move toward each other or move away from each other along the first screw rod;
the second shaper and the third shaper are connected to a second screw rod, a second driving apparatus is connected to the second screw rod, and the second shaper and the third shaper are driven by the second driving apparatus to move away from each other or move toward each other along the second screw rod;
in the first alignment mode, the first shaper and the fourth shaper are enabled to move toward each other, and the second shaper and the third shaper are enabled to move away from each other, so that the first shaper and the second shaper approach each other and the third shaper and the fourth shaper approach each other, to perform an alignment operation in the first alignment mode; and
in the second alignment mode, the first shaper and the fourth shaper are enabled to be in a standby state, and the second shaper and the third shaper are enabled to move toward each other, to perform an alignment operation in the second alignment mode.

13. The stacking apparatus according to claim 1, further comprising:

at least one manipulator, wherein the manipulator is configured to place at least one workpiece at a specified position on the stacking table in a specified orientation, and the specified position comprises a position at which a tray for accommodating the workpiece is located.

14. The stacking apparatus according to claim 1, wherein: the stacking table comprises a conveying guide rail, the conveying guide rail is configured to enable a tray for accommodating the workpiece to enter the stacking table or exit the stacking table along a second direction that intersects with the first direction, and a stopper is arranged near one end of the conveying guide rail that is away from the shapers.

15. The stacking apparatus according to claim 1, further comprising:

a detection apparatus for detecting a quantity of stacked workpieces in the workpiece queue.

16. A battery production line, comprising:

at least one stacking apparatus each according to claim 1; and a tray for placing the workpiece.

17. A stacking method, comprising:

a step of placing a first workpiece;

a step of aligning and pushing the first workpiece, wherein two end faces of the first workpiece along a first direction are pushed, through an alignment operation by shapers that act in pairs, to be aligned with each other, and an end face of the first workpiece along a second direction is pushed by a push plate to perform a pushing operation;

an alignment step, which enables a subsequent workpiece to be placed in such a way that the subsequent workpiece and the first workpiece face a same direction, wherein two end faces of the subsequent workpiece along the first direction are pushed through the alignment operation by the shapers, so that the two end faces of the subsequent workpiece along the first direction are aligned with the two end faces of the first workpiece along the first direction;

a pushing step, wherein after the alignment step, an end face of the subsequent workpiece that is farthest away from the first workpiece along the second direction is pushed through a pushing operation by the push plate, so that the subsequent workpiece approaches a workpiece adjacent to the subsequent workpiece along the second direction; and repeating the alignment step and the pushing step until the workpiece queue with a predetermined length is formed through stacking.

18. A stacking method using a stacking apparatus comprising a stacking table and shapers, the stacking method comprising:

a placement step, wherein to-be-stacked workpieces are placed on a tray carried on the stacking table;

an in-place step, wherein at least two shapers are made to be at ready positions to prepare for an alignment operation, and the shapers are moved forward along a second direction to positions corresponding to the to-be-stacked workpieces; and an alignment step, wherein shapers that act in pairs are made to perform an action of approaching each other along a first direction until shaping surfaces of the shapers are in contact with the to-be-stacked workpieces, so that the to-be-stacked workpieces are aligned.

* * * * *